United States Patent [19]
Nishiura et al.

[11] Patent Number: 5,444,533
[45] Date of Patent: Aug. 22, 1995

[54] FIBER-OPTIC GYROSCOPE OBTAINING A SIGNAL FROM A PERTURBED LIGHT SOURCE

[75] Inventors: Yozo Nishiura; Takaki Iwashita; Akihiro Ooka, all of Osaka, Japan

[73] Assignee: Sumitomo Electric Industries, Ltd., Osaka, Japan

[21] Appl. No.: 114,095

[22] Filed: Aug. 31, 1993

[30] Foreign Application Priority Data

Sep. 2, 1992 [JP] Japan .................. 4-260662
Feb. 22, 1993 [JP] Japan .................. 5-057756

[51] Int. Cl.6 ............................ G01C 19/72
[52] U.S. Cl. ............................ 356/350
[58] Field of Search ..................... 356/350

[56] References Cited

U.S. PATENT DOCUMENTS

| | | | |
|---|---|---|---|
| 4,529,313 | 7/1985 | Petermann et al. | 356/350 |
| 4,842,409 | 6/1989 | Arditty et al. | 356/350 |
| 4,848,910 | 7/1989 | Dupraz | 356/350 |
| 5,106,193 | 4/1992 | Feslea et al. | 356/350 |

FOREIGN PATENT DOCUMENTS

| | | | |
|---|---|---|---|
| 3742201 | 6/1989 | Germany . | |
| 0236114 | 9/1990 | Japan | 356/350 |

OTHER PUBLICATIONS

Patent Abstracts of Japan, vol. 16, No. 527 (P-1447) 29 Oct. 1992 & JP-A-A 04 195778 (Hitachi Ltd.) 15 Jul. 1992.

*Primary Examiner*—Samuel A. Turner
*Attorney, Agent, or Firm*—Cushman Darby & Cushman

[57] ABSTRACT

Conventional fiber-optic gyroscopes were provided with an independent photodetector for detecting interfering beams. The existence of the independent photodetector required two beam dividing-and-combining devices for equalizing the experiences of the clockwise-spreading beams and the counterclockwise-spreading beams. Curtailment of an expensive beam dividing-and-combining device is desirable for reducing the cost of gyroscopes. This invention dispenses with the independent photodetector. Instead of the independent photodetector, the light source itself or the monitoring photodiode detects the interfering beams by the change of driving current, applied voltage or photocurrent. Elimination of the independent photodetector saves one beam dividing-and-combining device by equalizing the path of the progressing beams to the path of the regressing beams. Optimum light sources, interposition of polarizer, position of depolarizer and use of birefringent material as polarizer are explained.

29 Claims, 25 Drawing Sheets

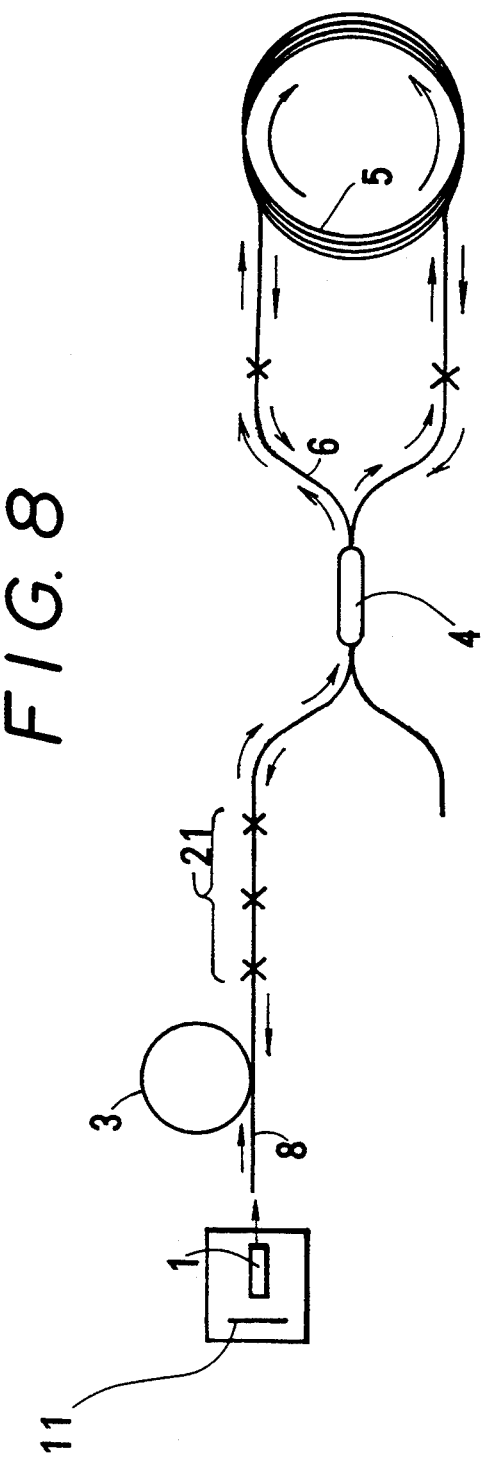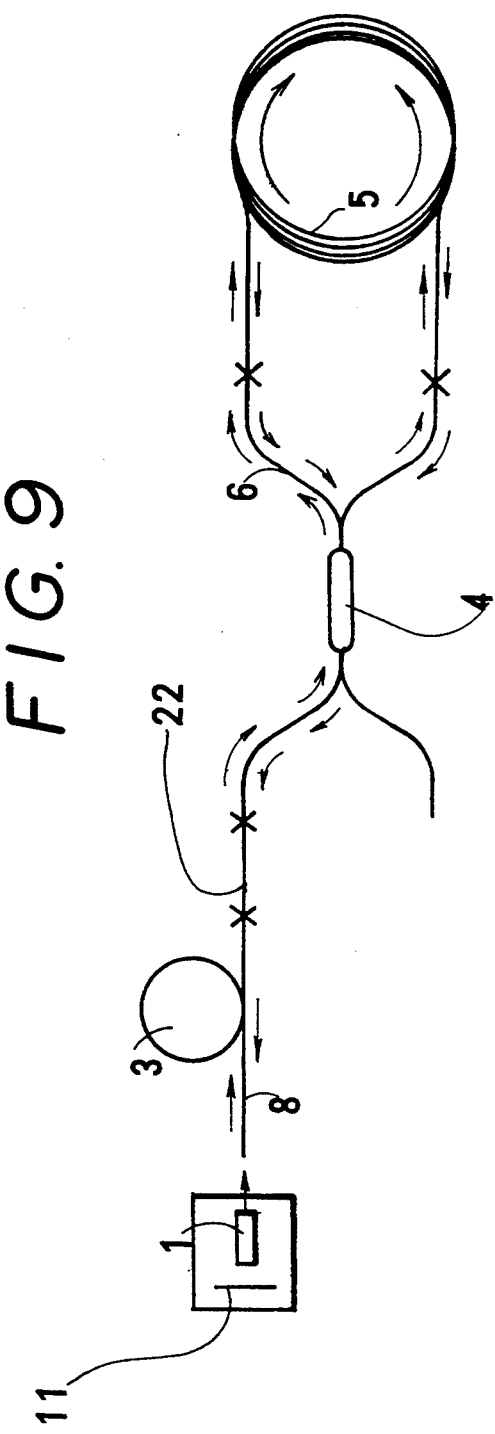

FIG. 22
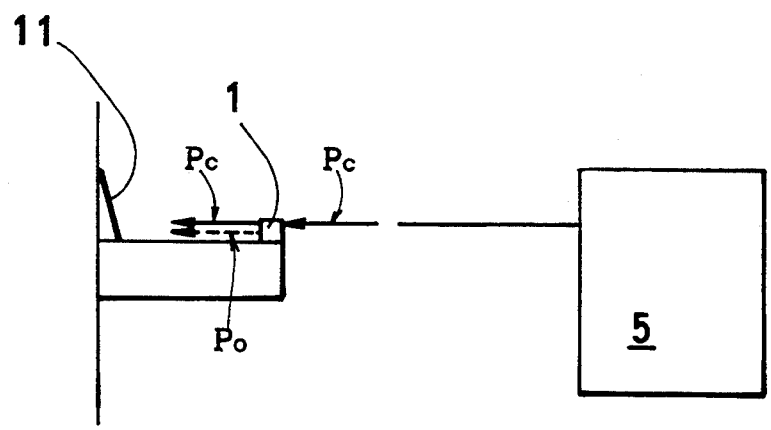
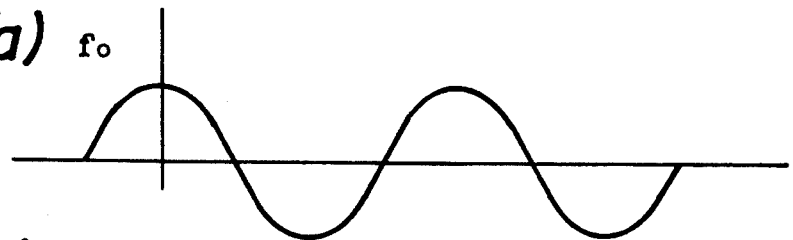
FIG. 23(a)  $f_o$
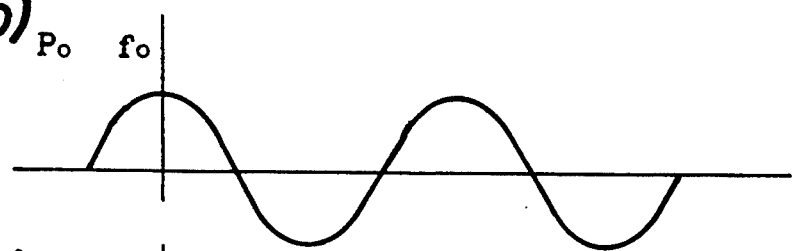
FIG. 23(b)  $P_o$  $f_o$
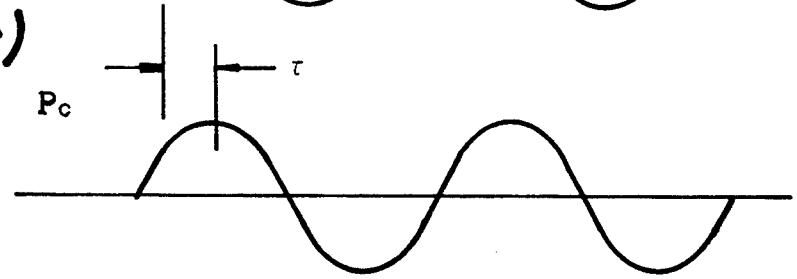
FIG. 23(c)  $P_c$  $\tau$ $$d = t \times \frac{|n_e^2 - n_o^2|}{2 n_o n_e}$$

F I G. 35
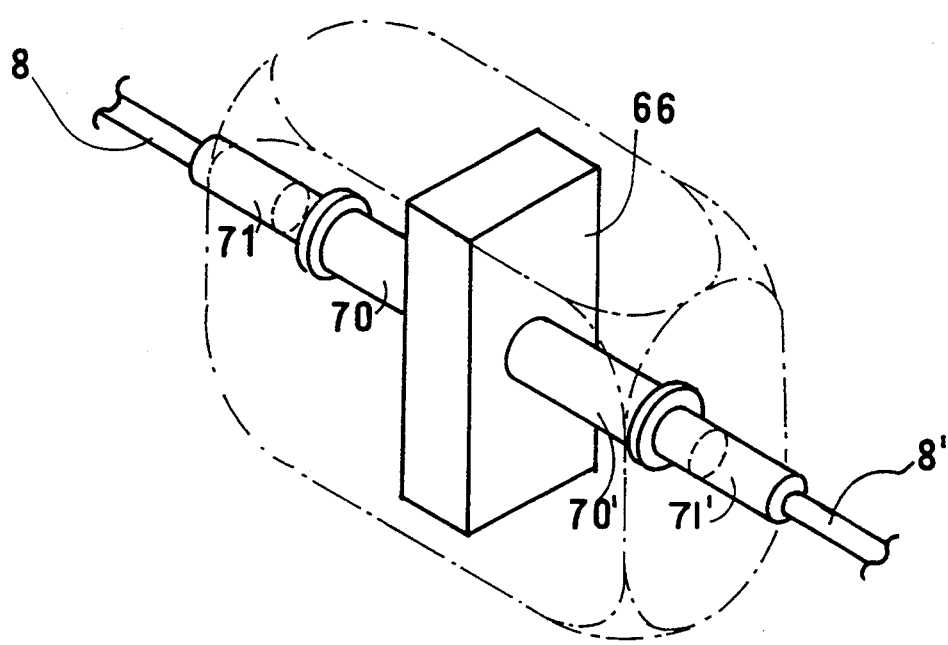
F I G. 36
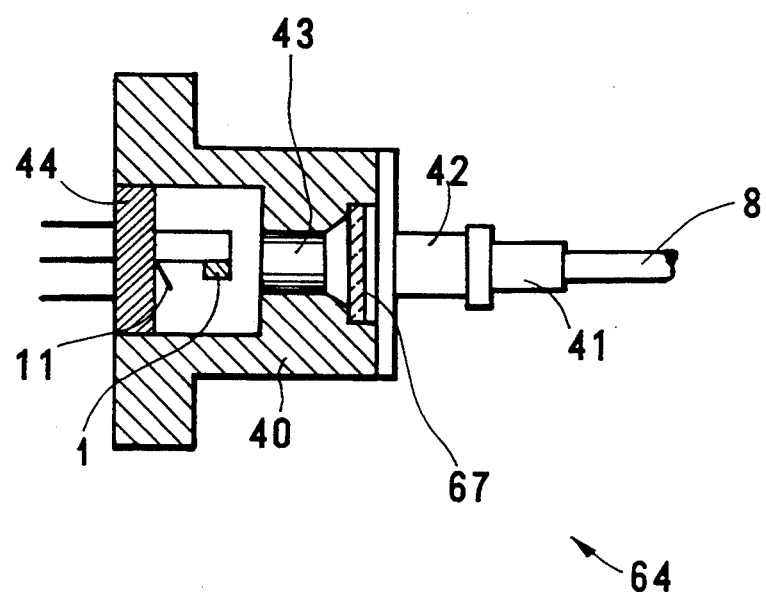

FIBER-OPTIC GYROSCOPE OBTAINING A SIGNAL FROM A PERTURBED LIGHT SOURCE

FIELD OF THE INVENTION

This invention relates to a fiber-optic gyroscope which deduces a signal from a light source. A fiber-optic gyroscope measures angular velocity or rotation speed of a moving object e.g. airplanes, ships or automobiles.

BACKGROUND OF THE INVENTION

This application claims the priority of Japanese Patent Applications No. 260662/1992 filed Sep. 2, 1992 and No. 57756/1993 filed Feb. 22, 1993 which are incorporated herein by reference.

A fiber-optic gyroscope measures an angular velocity by splitting monochromatic light beams into halves, propagating the beams clockwise and counterclockwise in a fiber coil which has many windings of a single-mode fiber making the clockwise-spreading beam and counterclockwise-spreading beam interfere with each other and detecting the light intensity of the interfering beams by a photodetector. A fiber-optic gyroscope is constructed by a light source, a fiber coil, beam dividing-and-combining devices, and a photodetector. FIG. 2 shows a fundamental structure of prior fiber-optic gyroscope. A light source (1) emits monochromatic light beams. Passing through a second beam dividing-and-combining device (2), the light beams are polarized by a polarizer (3) into linearly-polarized beams. The lineary-polarized beams are divided into halves by a first beam dividing-and-combining device(4). All dividing-and-combining devices are shown as dividing-and-integrating devices in figures annexed to this application. Partial beams enter both ends of a fiber coil (5) which is fabricated by winding a single mode fiber into many turns. The fiber coil is an optical path for inviting Sagnac Effect between the clockwise-spreading beam and the counterclockwise-spreading beam. When the fiber coil is rotating, optical paths for the clockwise beam and counterclockwise beam become different. A phase difference $\Delta\theta$ appears between the clockwise beam and the counterclockwise beam. The phase difference decreases the intensity of the interfering beams. This decrease in intensity is a function of the phase difference $\Delta\theta$. In practice, the beams propagated clockwise and counterclockwise meet together at the first beam dividing-and-combining device (4), pass through the polarizer (3), reflect at the second beam dividing-and-combining device (2) and enter the photodetector (7). In the photodetector, the clockwise beam and counterclockwise beam interfere with each other. The intensity of the interfering beams is detected by the photodetector. The decrease of the output of the photodetector teaches the angular velocity of the fiber coil.

The light source (1) is indispensable for producing light beams which propagate in the fiber coil clockwise and counterclockwise. The photodetector senses the change of the intensity of interference beams including the phase difference between the clockwise beam and counterclockwise beam. Two beam dividing-and-combining devices are used in a conventional fiber-optic gyroscope. Such a structure shown by FIG. 2 is well known as a "minimum configuration" of a fiber-optics gyroscope. All practically-used fiber-optic gyroscopes and all proposed fiber-optic gyroscopes are versions of the minimum configuration shown by FIG. 2. There are various revisions of the fundamental structure shown by FIG. 2. However, no prior one has succeeded in curtailing any part included in the minimum configuration.

FIG. 3(a) demonstrates the operating principle of a fiber-optic gyroscope. The gyroscope consists of a light source (1), a beam dividing-and-combining device (4), a fiber coil (5) and a photodetector (7). Light beams emanating from the light source (1) are divided into halves by the beam dividing-and-combining device, e.g. a beam splitter, a fiber coupler, etc. Two partial beams enter both ends of the optical fiber coil (5) and spread clockwise and counterclockwise in the many turns of the fiber coil. The clockwise propagating beam and the counterclockwise propagating beam are integrated at the beam dividing-and-combining device (4). The interfering beams are detected by the photodetector (7). The principle of the gyroscope includes only one beam dividing-and-combining device. However, such fiber-optic gyroscopes has not been used as it is. In the structure, the paths which the clockwise-spreading beam and the counterclockwise-spreading beam experience are different, since the photodetector and one end of the coil are positioned on one side of the beam dividing-and-combining device, and the light source and the other end of the coil are positioned on the other side thereof. FIGS. 3(b) and 3(c) demonstrate the path of the partial beams. The clockwise beam (CW) is reflected twice by the beam splitter (4). See FIG. 3(b) Here the beam dividing-and-combining device is referred to as a beam splitter in short. The counterclockwise beam (CCW) is not reflected but passes straightforward twice through the beam splitter. See FIG. 3(c) Optical paths are different for the reflection and the straight passage. Even when the fiber coil is at rest, some phase difference is induced between the clockwise beam and the counterclockwise beam owing to the single beam splitter. A fiber coupler is often used instead of the beam splitter as a beam dividing-and-combining device. The same difficulty will accompany the gyroscope having one coupler.

The structure of FIG. 3(a) is incapable of equalizing the experiences of the clockwise beam and the counterclockwise beam exactly. To avoid the difficulty, the fundamental structure of FIG. 2 has been employed. The gyroscope of FIG. 2 forces both the clockwise beam and counterclockwise beam to experience reflection once and straight passage once equally. The clockwise beam is reflected first and then passes straight at the beam splitter. The beam passes straight first and is reflected next. FIG. 2 can equalize the experiences of the both spreading beams. In the case of a fiber coupler instead of a beam splitter, the structure of FIG. 2 can solve the same difficulty. In any kinds of beam dividing-and-combining devices, the device illustrated in FIG. 2 can keep the phase difference to zero when the gyroscope is at rest. The gyroscope of FIG. 2 harmonizes the experience of the clockwise-spreading beam with the experience of the counterclockwise beam. Therefore, the assembly of FIG. 2 is called a minimum configuration.

Drawbacks of the prior fiber-optic gyroscope will now be explained. The gyroscope of FIG. 2 requires two beam dividing-and-combining devices (2) and (4). A single beam dividing-and-combining device is sufficient only to divide light into halves and to integrate again. The other beam dividing-and-combining device is required to equalize the experiences of the clockwiseand counterclockwise-propagating beams. Two beam dividing-and-combining devices enhance the cost of parts and the cost of assembly.

Especially in the case of all-fiber type of gyroscopes, the beam dividing-and-combining device is a fiber coupler. A fiber coupler is fabricated by bringing two optical fibers into contact, heating the fibers for melting together, pulling the molten fibers, and letting the fiber cores approach each other within the distance which enables the fiber cores to couple with each other through evanescent waves. If a light beam enters one end of a fiber, the beam will be divided through the evanescent coupling and two beams will go out from two ends of the fibers. The ratio of the intensity of the two beams must be settled to be 50:50 by adjusting the pulling length of the molten fibers. The difficulty of fabrication raises the cost of such fiber couplers. Thus, the fiber coupler is more important than other parts in view of the total cost of the gyroscope.

Another drawback of FIG. 2 is the loss of light energy at the second beam dividing and integrating device (beam splitter) (2). The second beam splitter (2) yields in both ways extra beams which will be abandoned as ineffective beams. The energy of the abandoned beams is half of the total light energy. Namely, half of the beams emanating from the light source is reflected at the second beam splitter (2) and is abandoned in vain. Furthermore, half of the returning beams from the fiber coil (5) pass straight through the beam splitter (2) and is abandoned similarly at the light source. At most one fourth of the energy is used effectively in the gyroscope of FIG. 2. The second beam splitter invites 6 dB of the loss of light energy. The gyroscope of FIG. 2 sustains a low efficiency of light power and a low S/N ratio (signal to noise ratio).

Saving one beam dividing-and-combining device is desired for the gyroscope. Decreasing the dividing-and-combining devices to one device will efficiently reduce the parts cost and the loss of light power. However, all parts appearing in FIG. 2 seem to be indispensable. A gyroscope would malfunction, If any part was eliminated from the minimum configuration of FIG. 2. A blunt removal of one beam dividing-and-combining device will lead to the structure of FIG. 3(a). However, FIG. 3(a) generates offset between the optical paths of clockwise- and counterclockwise-spreading beams. The structure of FIG. 3(a) is inapplicable to the practical use.

One purpose of this invention is to provide a fiber-optic gyroscope which allows to reduce the number of beam dividing-and-combining devices to one beam dividing-and-combining device without deteriorating the equality of the optical paths of the clockwise- and counterclockwise beams. A second purpose of this invention is to provide a fiber-optic gyroscope which dispenses with a photodetector. A third purpose of this invention is to provide a fiber-optic gyroscope enabling to reduce the parts cost and assembly cost. A fourth purpose of this invention is to provide a fiber-optic gyroscope which is endowed with high sensitivity by adopting an optimum light source. Fifth purpose of this invention is to provide a fiber-optic gyroscope which is immune from the fluctuation of the scale factor.

SUMMARY OF THE INVENTION

The fiber-optic gyroscope of this invention eliminates the photodetector which detects the intensity of the interfering beams in conventional fiber optic gyroscopes. Instead of the photodetector, this invention detects the intensity of the interfering light beams by the light source itself or a monitoring photodetector accompanying a light source. Namely, the light source or the monitoring photodetector plays a role of a photodetector. Removal of the photodetector allows the gyroscope to eliminate one beam dividing-and-combining device also. Because the photodetector is eliminated, the second beam dividing-and-combining device which reflects the returning light to the photodetector becomes unnecessary. The photodetector is replaced by the light source or the monitoring photodetector belonging to the light source.

One of the problems of fiber-optic gyroscope has been the instability of the light source. If the power of the light source fluctuates, the output of the photodetector will also fluctuate, which will invite the change of the scale factor. Thus the power of the light source must be stabilized. An auxiliary photodetector is usually mounted at the bottom of a package of a light source. The light source emits light bilaterally both to the front and to the back. The front beams pass through a top window of a package. The back beams enter the auxiliary rear photodetector. The photodetector monitors the light power of the source. Thus, the auxiliary photodetector is called a monitoring photodetector which is different from the main photodetector (7) in FIG. 2 or in FIG. 3(a). A conventional light source has been controlled to emit a constant power of light by detecting the light power by the monitoring photodetector and adjusting the injection current to cancel the deviation of the light power from a predetermined value. This is called an automatic power control of a light source. This invention takes advantage of the general structure of a light source.

Furthermore, this invention makes use of the returning light to the light source from the fiber coil which has been deemed to be only noise and troublesome for the light source, because the returning light has been likely to induce the instability of light emission.

If light beams return to the light source (laser diode or photodiode), the relation between current (input) and light emission (output) is changed by the instability induced by the returning light. The intensity of the interfering light beams can be measured by investigating the change of the relation between current and light power. If the input-output relation of light sources is heavily influenced by the returning beams, the intensity of the returning beams shall be detected from the change of the input-output relation (emission performance) of the light source. The inventors have noticed the fact first. Almost all persons skilled in the art abhor the light beams returning to the light source and use isolators in front of the laser diode to avoid this. But the inventors take advantage of the instability of the light source induced by the return of the light.

Change of the emission performance of the light source is detected either by the variation of driving current of the light source or by the variation of photocurrent of the monitoring photodiode. This invention proposes a quite novel fiber-optic gyroscope which positively let the returning light beams to the light source change the input-output relation (emission performance) at the light source. As mentioned before, all conventional fiber-optic gyroscopes have endeavored to keep the light power constant for avoiding the fluctuation of the scale factor. This invention stands against the generally accepted idea. Therefore, invention is quite novel.

FIG. 1 shows a fundamental structure of a fiber-optic gyroscope of this invention. A light source emits monochromatic or quasi-monochromatic light beams. The light source has a monitoring diode (not shown) for monitoring the power of the light which emanated backward to the diode. The forward light beams pass through an optical fiber (8) and are divided in half by the beam dividing-and-combining device (4). The divided beams enter both ends of a fiber coil (5). The beams rotate clockwise and counterclockwise in the many turns of the fiber coil. The beams go out from the other ends and gather at the beam dividing-and-combining device (4). Then the integrated beams return to the light source (1). The light source (1) is a laser diode or a superluminescent diode in which the emission performance is varied by the returning light beams.

This invention detects the change of the emission performance by some means as follows:

①The change of the emission performance induces the variation of the impedance of the light source. The ratio (I/V) of current (I) to voltage (V) of the light source changes by the return of the light in accordance with the change of the emission performance. The ratio (I/V) teaches the intensity of the returning, interfering beams.

②The simplest way is to keep the driving current constant and to measure the voltage of the light source.

③An alternative is to keep the voltage constant and to measure the driving current of the light source.

④The change of the emission performance can be detected by the variation of the ratio (P/I) of the power (P) of the light source to the driving current (I). The power (P) is measured by the monitoring diode. The ratio (P/I) is easily calculated.

⑤A simple version is to keep the light power constant by monitoring the diode output and to measure the change of the driving current.

⑥Another way is to keep the driving current constant and to measure the change of the light power by the monitoring diode.

FIG. 4 demonstrates an example of parts of the light source. The light source has a light emitting device (1), a monitoring diode (11) and APC circuit (9). The light emitting device (1) is a superluminescent diode or a laser diode which emits monochromatic or quasi-monochromatic light. The light emitting device (1) is controlled by the APC (Automatic Power Control) circuit. APC circuit is used to stabilize the power output in conventional gyroscopes.

The semiconductor light emitting device emits beams in both directions from a front end and a rear end of a chip. The front beams penetrate a lens (10) and enter an end of an optical fiber (8). The front beams are ordinary signal beams. The rear beams emanate from the rear end of the chip and enter the monitoring diode (11) for detecting the power of the light emitting device. The intensity of the front beams is proportional to the intensity of the rear beams. The direct proportion allows the diode to measure the power of the front beams. The signal of the power is sent from the diode (11) to the APC circuit (9). The APC circuit (9) adjusts the driving current of the light emitting device (1) in order to keep the light power constant. A first resistor $R_1$ is located between the light emitting device (1) and the APC circuit (9) in the driving lines. Both ends of the first resistor $R_1$ are terminals (12) for detecting the driving current. The voltage appearing between the terminals is denoted by $V_1$. A second resistor $R_2$ is interposed between the monitoring diode (11) and the APC circuit (9) in the monitoring lines. Both ends of the second resistor $R_2$ are terminals (13) for detecting the light power. The voltage between the terminals (13) is denoted by $V_1$. Some conventional fiber-optic gyroscopes include such an assembly of a light emitting device, a monitoring diode and an APC circuit. This invention can be realized by taking advantage of the inherent assembly of conventional gyroscopes.

Such a structure of a fiber-optic gyroscope reduces to one the number of photodetectors and the number of beam dividing-and-combining device. Because this invention proposes a quite novel fiber-optic gyroscope which differs from conventional gyroscopes in the measuring principle, special consideration must be paid to the selection of light sources.

Prior fiber-optic gyroscopes preferred light sources having a coherent length which is as short as possible. If the coherent length of a light source is long, the returning light by Rayleigh Scattering or Kerr Effect has a large influence upon the emission performance and brings about big fluctuation of the scale factor. To avoid the fluctuation of the scale factor, most of the conventional gyroscopes employed superluminescent diodes which emit quasi-monochromatic light with a short coherent length. Other conventional gyroscopes using a laser diode as a light source adopted a special laser diode with a very short coherent length. In conventional gyroscopes of the return of light to the light source was avoided, because laser diodes suffered instability of oscillation motion due to the returning light. Conventional gyroscopes often installed an isolator in front of the light source to prevent the returning light from entering the source.

On the contrary, this invention makes use of the change of the emission performance of the light emitting device induced by the interaction between the returning light and the light emitting device. The difference of the principle demands different kinds of light sources.

If a superluminescent diode was adopted as a light source of this invention, a new problem would appear. The superluminescent diode has so short a coherent length that the returning light beams cannot interact enough with the light source. Poor interaction of the diode with the returning light induces little change of the light power in the superluminescent diode. Small change of the light power lowers the sensitivity of the rotation velocity. Another problem is high absorption of the returning light.

When a superluminescent diode emits only natural emission beams (no induced emission), almost all returning light is absorbed in the light waveguide on the diode chip and a little returning light reaches the monitoring diode. If the version in which the returning light is detected by the monitoring diode shall be employed, the monitoring diode could hardly sense the returning light. The absorption by the device chip suppresses the sensitivity to the returning light. The inventors have found that a preferable light source should have a long coherent length in contradiction to conventional gyroscopes. A long coherent length enhances the interaction of the returning light with the light source. Vigorous interaction heightens the change of the light power, change of the driving current or change of the bias voltage as a function of the change of the intensity of the returning beams. Thus, it is preferable to adopt a light source with a long coherent length in the gyroscope of this invention.

This invention employs a high-coherency light source. A high-coherency light source with a long coherent length enhances the sensitivity for the returning light beams by energizing the interaction between the returning light and the light source chip. A semiconductor laser diode may be most suitable, for this reason. However, a laser diode with high coherency will suffer the effect of non-signal returning light which is produced by the back scattering such as Rayleigh Scattering or Kerr Effect in the fiber. Such non-signal returning light will similarly perturb the emission of the light source. The light source shall be subject to the influence of the returning, interfering signal light but shall be immune from the influence of the non-signal returning light. Thus, preferable light sources of this invention are:

① a laser diode with multi-longitudinal modes
② a superluminescent diode with multi-longitudinal modes Adoption of such a light source will enable the gyroscope to suppress the influence of the non-signal returning light induced by Rayleigh Scattering or Kerr Effect. The light source will enhance the reliability of the measurement of angular velocity by returning only the interfering beams to the light source.

Another problem is an accidental rotation of polarization planes occurring in a optical fiber. If a fiber coil or a fiber path is constructed with single-mode fiber, distortion of fibers or electromagnetic force will induce the rotation of polarization planes. A gyroscope lets the clockwise-spreading beam and the counterclockwise-spreading beam interfere with each other and measures the intensity of interfering beams. Interference of beams demands that the beams have the same polarization. If two beams have different polarization planes perpendicular to each other, the two beams cannot interfere at all. The intensity of interfering beams diminishes in proportion to cosine of the angle held between the polarization planes of two beams. If the rotation of polarization planes occurs in a fiber, the intensity of interfering beams will fade. The intensity of interfering beams fluctuates because of the accidental rotation of the polarization planes in a single-mode fiber. The rotation of polarization impedes a precise measurement of the angular velocity.

One solution for the rotation of polarization is fabricating all parts with the parts which are favored with a polarization maintaining function. This invention first proposes a source-detecting type gyroscope which is constructed with the parts having the polarization maintaining function. Here, the source-detecting type means that the gyroscope lacks an independent photodetector and the change of interfering beams is detected by a light source. FIG. 15 shows a schematic view of the gyroscope. All fibers used in FIG. 15 are polarization maintaining fibers (birefringent fibers). The fiber coil (5) is made from a polarization maintaining fiber instead of a cheap single-mode fiber. The fiber coupler (4) is also made from two birefringent fibers. The gyroscope of FIG. 15 can prevent the polarization planes of beams from rotating.

However, it costs much money to fabricate a gyroscope with expensive parts which have the polarization maintaining function. In order to produce an inexpensive gyroscope, the fiber coil and fiber path shall preferably be built with cheap single-mode fibers, because a single-mode fiber is much cheaper than a birefringent fiber. Thus, this invention next proposes a gyroscope which is fabricated with single-mode fibers provided with a depolarizer. FIG. 16 shows a second version of this invention along with the idea for curtailing birefringent fibers. The whole of the fibers consists of single-mode fibers. A depolarizer (20) is inserted into an end part of the fiber coil (5). The fiber coupler is also fabricated with single-mode fibers. The depolarizer can be inserted otherwise between the light source and the coupler. The depolarizer prevents the interfering beams from fluctuating due to the rotation of the polarization planes, because the depolarizer can depolarize beams passing therethrough.

Alternately, a polarizer or birefringent material 145 should be inserted between the light source and the fiber end as shown by FIG. 17. The position of the polarizer or birefringent material may be either between the light source and the lens (10) or between the lens (10) and the end of the fiber (8). The polarizer denotes any device which has the function converting the polarization state into the linearly-polarized state, e.g. a polarization prism, polarization plate, metal-dielectric multi-layer, dichroic mirror, glass substrate on which dielectric multi-layers are formed, fiber-type polarizer, etc. In the case of discrete polarizer, It is convenient to interpose the polarizer between the light source and the fiber end. In the case of fiber-type polarizer, it shall preferably be interposed at a point of either an end of the fiber coil (5) or a midway point of the coil.

Conventional fiber-optic gyroscope makes use of an optical glass with antireflection coating for the window material of the light source 1. It is convenient for this invention to make the window 50 in cap 49 with a polarizer or a birefringent material as shown by FIG. 20. FIG. 20 demonstrates a cap-sealed light source.

Some of prior fiber-optic gyroscopes employ the phase-modulation for deducing phase difference exactly from the interfering beams. The source-detecting type gyroscope of this invention can also adopt the phase-modulation. FIG. 25 shows an example of a phase-modulated source-detecting gyroscope. A phase-modulator (14) is interposed at a point of an end of a fiber coil (5). An oscillator such as a sine wave oscillator (15) drives the phase-modulator (14) in sine wave form at a pertinent frequency.

Furthermore, direct modulation of light source is also possible in this invention. FIG. 24 shows an example of the direct modulation. A sine wave oscillator (60) is directly phase-modulating the light source (1) at a frequency $f_o$. A phase-modulator (14) endows the light beams with the phase modulation at a frequency $f_m$. The monitoring photodetector (11) originates a photocurrent 102 as an output signal. The photocurrent is synchronously demodulated at the frequency $f_o$ and the frequency $f_m$. The ratio of the $f_o$-demodulated signal to the $f_m$-demodulated signal is a function of phase difference. the phase difference is obtained by dividing the $f_o$-demodulated signal by the $f_m$-demodulated signal. Otherwise, if the intensity of the $f_o$-demodulated signal is kept constant by some means, the rotation velocity is able to be deduced only from the $f_m$-demodulated signal.

The function of this invention will be now explained. The fiber-optic gyroscope of this invention lets the clockwise-spreading beam and the counterclockwise-spreading beam combine with each other by the coupler and return positively to the light source. The return of the interfering beams changes the emission performance of the light source. Namely, the ratio of driving voltage to driving current or the ratio of driving current to light power is varied by the returning light due to the instability of the semiconductor light emitting device. The change of the emission performance can be deduced as the change of source current, change of bias voltage, change of impedance or change of photocurrent of the monitoring diode. Measurement of any one of the variables teaches us the intensity of the interfering beams between the clockwise beam and counterclockwise beam.

Especially, when the light source is controlled by APC (Automatic Power Control) mode, the driving current changes according to the variation of the interfering beams. Thus the driving current becomes an object of observation. The change of the driving current can be deduced from the voltage $V_1$ between terminals (12) of a resistor $R_1$ of FIG. 4, since the resistor is interposed in the driving lines of the source (1). The intensity of the interfering beams can be deduced from the change of the voltage. However, the change of the voltage is small and is buried in noise. An exact signal can be clearly extracted from the noise-burying signals by some improvements. For example, in the case of a phase-modulated gyroscope, a signal can be obtained by installing a phase-modulator near the fiber coil, applying phase-modulation to the signal beams passing there, and synchronously detecting the signal part of a pertinent frequency. The phase-modulation method allows the gyroscope to detect the intensity of the interfering beams with high S/N ration.

There are also other ways of obtaining signals besides the method depending on $R_1$. When the light source is controlled by the APC controller, some change appears in accordance with the change of the interfering beams in the output of the monitoring diode (11) mounted on the rear side of the light source chip (1). The change of the output of the monitoring diode can be obtained by the voltage appearing at terminals (13) connected to ends of the resistor $R_2$.

Even when the light source is not controlled by an APC controller, another mechanism produces a signal in the monitoring diode (11). In general, semiconductor light emitting devices are likely to absorb light beams with the wavelength which is equal to the wavelength of the light emanating from the devices. However, light emitting devices are not fully opaque to the light with the same wavelength. A part of the light will penetrate the layers of the chips through horizontally. When the phases are coincident between the emanating beams and the returning beams, the emanating beams are stimulated by the returning beams. Thus, stronger beams than the returning beams will often be emitted from the rear end to the monitoring diode. Then the monitoring diode receives the rear beams with the intensity in proportion to the intensity of the returning beams. Namely, the interfering beams are sensed by the monitoring diode.

The fiber-optic gyroscope of this invention obtains the power of the interfering beams from the change of current, voltage, impedance of the light source, or the change of the photocurrent of the monitoring diode.

The selection of light sources is explained below. As mentioned before, this invention prefers a light source interactive with returning beams to non-interactive one. This invention differs thoroughly from conventional gyroscopes at this point. The reason is now explained in detail.

Some light sources produce light beams partly by induced emission and partly by natural emission. Such light sources emit partially-coherent light. Thus, the interactivity between the newly-induced beams and the reciprocating beams is intermediated between 0 and 1. High interactivity means that the laser emission in which the reciprocating beams are reinforced by newly-yielded beams in phase. On the contrary non-interactive source means that a light emitting diode in which the return of light has no influence upon the emission performance. In the source where the induced emission prevails, the high coherency is likely to let the returning beams change the driving current. The high coherency endows the device with a function of amplification. Thus the returning beams are amplified by the light source chip itself. The amplified beams reach the monitoring diode at the rear position. Thus high coherency will enhance the sensitivity to detect the interfering beams by the driving current or by the output of the monitoring diode.

On the contrary, the natural emission means the state that photons are produced at random in the active layers of the source chip. The natural emission cannot amplify the returning light by the newly-produced light. In a light source chip, supplying current to a pn-junction produces pairs of electrons and holes. Recombination of the electron and the hole emits a photon. Photon is a quantum of light. Random generation of photons is the natural emission. The intensity of emanating light depends only upon the driving current but is entirely independent of the returning light. Ordinary light emitting diodes or superluminescent diodes yield light beams by the natural emission.

Stimulated emission or induced emission means an in-phase photon production in proportion to the quantity of photons there. In-phase means that the phase of newly-produced light coincides with the phase of the returning light. The probability of the production of the photon is in proportion both to the light intensity of the returning light there and the driving current. The laser diode produces light by the stimulated emission. Thus the phases of the beams are totally coincident in the laser diode.

Stimulated emission (or induced emission) is the main function of laser diodes for producing light beams. However, the stimulated emission Itself endangers the emission performance of the laser diode due to the returning light. Passing through an waveguide of the laser chip, the returning light invites the stimulated emission and the stimulated light has the phase which is different from the phase of the main light which has been reciprocating in the resonator. The additional stimulated emission disturbs the uniform excitation of the active layers of the chip. It is unstable for a laser diode that two light beams with different phases reciprocally propagate in the active layers. In order to avoid such an inconvenience, ordinary fiber-optic gyroscopes often provide the laser diode with an isolator.

In the explanation above, the interactivity means that the function of inducing the stimulated emission by letting the light being appearing interact with the spreading light in the waveguide. Here the vigor of the interactivity is a value between 0 and 1. 1 of the interactivity means complete predominance of stimulating emission over natural emission. The returning light beams seriously affect the emission state of the laser.

On the contrary, 0 of the interactivity means the superiority of natural emission to the stimulated emission. The intensity or phase of the light being appearing is totally indifferent to the propagating light in the waveguide. The return of light has no influence upon the emission state. Namely, the returning light can neither amplify nor attenuate the light production in the laser diode.

Prior fiber-optic gyroscopes preferred low-interactive light sources, since the low-interactive light sources were immune from the influence of the returning light which was generated by Rayleigh Back Scattering or Kerr Effect. The light source insensitive to the returning light well forbids the scale factor from fluctuating and the offset from appearing.

This invention prefers a high-interactive light source in contradiction to the general idea. FIGS. 13a-1 through 13b-3 illustrate the relation between the emission spectrum and the coherency of laser diodes. FIG. 13a-1 illustrates the emission spectrum of an ideal laser diode. There is a single longitudinal mode in the spectrum. The light has a single wavelength with a sharp peak. The half value width $\Delta\lambda$ of the peak is very small. The light is produced by the stimulated emission. The light beams reciprocate in a resonator and synchronize the phase. Thus the wavelength is determined to be a single value. The wavelength of stationary light waves is equal to one of quotients of the length of the resonator divided by integers. A laser diode has an inherent scope of wavelengths of emanating light. If the scope of emittable light wavelength is so small that the scope includes only a single quotient of the resonator length divided by an integer, only a single longitudinal mode stands. FIG. 13a-1 shows the relation between the distance and the interactivity. The abscissa denotes the distance (L) from the end of the laser chip. The ordinate designates the interactivity. The interactivity is defined by the ability of wave functions distanced by L for interacting with each other. The interactivity is obtained by multiplying a unit wave function at the end by another unit wave function distanced by L, and integrating the product. A unit wave function means the normalized wave function whose inner product is 1; the integration of the square is 1.

The interactivity declines slowly as a function of the distance. Slow decline of the interactivity is equivalent to a long coherent length. It is a matter of course, because the half width $\Delta\lambda$ is very narrow and wavelength dispersion is very small. The distance at which the interactivity reduces to half of the initial value is denoted by Lc. Lc is called a coherent length. The ideal laser diode has a long coherent length Lc. Since the coherent length is in proportion to $(\lambda^2/\Delta\lambda)$, a small half breadth $\Delta\lambda$ brings about a large Lc.

FIG. 13a-2 illustrates an emission spectrum of a superluminescent diode. The abscissa is the wavelength. The ordinate is the intensity of the light. Unlike a laser diode, the half width $\Delta\lambda$ is wide in the spectrum. Although the region of wavelength of emission is roughly determined at a point, the light of the superluminescent diode is an assembly of beams having various wavelengths. Thus the light can safely be called "quasi-monochromatic" rather than "monochromatic". It is a kind of diode without a resonator. No longitudinal mode appears. The concept of longitudinal modes does not exist in a diode. The coherent length Lc is very short, since Lc is in proportion to $\lambda^2/\Delta\lambda$ and $\Delta\lambda$ is wide. FIG. 13b-2 the interactivity as a function of distance from the end of the diode. The interactivity decreases quickly. The coherent length is very short. Most of the prior fiber-optic gyroscopes have been adopted superluminescent diodes as light sources, since they believed that a short coherent length of source was suitable.

FIG. 13a-3 shows an emission spectrum of third kind of light source. The light source has an intermediary character between the laser diode and the superluminescent diode. Although it may be called "monochromatic", the region of emission wavelengths is very wide. Furthermore, several longitudinal modes appear as sharp peaks in the emission spectrum. Since the laser diode has a resonator, i.e. cleavage mirrors at both ends, standing waves must have a wavelength equal to a quotient of length of the resonator divided by an integer. An ideal laser diode has a single wavelength satisfying this condition in the narrow emission spectrum. However, this compromising device of FIGS. 13a-3 through 13b-3 has plural wavelengths in the emission region which suffices the condition of wavelengths being equal to the quotients of the resonator length divided by integers. Individual peaks in the emission spectrum of FIG. 13a-3 correspond to the quotients. The broad emission region makes plural peaks of longitudinal modes (wavelengths of standing waves). Breadths $\Delta\lambda_2$ of individual peaks are narrow enough, but the breadth $\Delta\lambda_1$ of all peaks unifying the individual peaks is wide to the contrary. FIG. 13b-3 the dependence of interactivity on the distance. In correspondence with the narrowness of the individual longitudinal mode peaks, the envelope (dotted line) covering individual interactivity peaks declines slowly. However, the slowly-declining curve is an envelope but is not individual interactivity curves. The practical interactivity curves are separated peaks appearing at the points distanced by a certain length. Although the envelope of the peaks declines slowly, the individual curves themselves decrease rapidly. If the length $Lc_1$ of degradation to half of the individual peaks is called coherent length, the coherent length is as short as the coherent length of the superluminescent diode of FIG. 13b-2. Short $Lc_1$ derives from the wide breadth $\Delta\lambda_1$. The slow decline of the envelope originates from small $\Delta\lambda_2$. The distance between neighboring individual peaks is determined by the spacing namely by the length of the resonator. This invention employs a light source having plural longitudinal modes (plural standing waves).

The following experiment has been done in order to examine the effect of employing such a compromising light emitting device as a light source of a fiber-optic gyroscope. A modified superluminescent diode has fabricated by coating both ends of the waveguide of a laser diode with antireflection layers (AR layer). The superluminescent diode has been adopted as a light source of a fiber-optic gyroscope. The light source is originally a laser diode. The reflection at the resonator (both ends of the waveguide) was reduced by the AR coating. The induced mission is suppressed. Thus, the device can be called a superluminescent diode rather than a laser diode. The signal of the gyroscope is deduced from the monitoring photodiode. The intensity of the superluminescent diode is changed by varying the driving current. The output of the monitoring photodiode changes as a function of the light power. The relation between the output of the monitoring diode and the light power has been observed. FIG. 14 denotes the result of the observation. The abscissa is the light power (mW) of the superluminescent diode. The ordinate is the output of the monitoring diode. The output of the monitoring diode is nearly zero till the light power attains 1 mW. The output of the monitoring diode gradually increases between 1 mW and 2 mW. Then the output rises rapidly above 2 mW.

Emission spectra are drawn at some points along the main curve in FIG. 14. The light power of 1 mW is produced by natural emission (spontaneous emission). Thus the spectrum is broad without subpeaks. The spectrum is similar to the diode of FIG. 13a-2. Such weak emission is of no use as a light source of a gyroscope. When the light power rises to 1.5 mW, several longitudinal modes appear in the spectrum. 1.5 mW is still too weak for the light source of a gyroscope. Above 1.5 mW, the output of the diode quicky enlarges. 2 mW of light power reveals a clear-cut separation of longitudinal modes. Vigorous longitudinal modes signify the prevalence of stimulated emission (induced emission). Further, when the light power attains 2.3 mW, the output of the monitoring diode reaches a sufficient level for measuring the angular velocity. Then the heights of the peaks of the longitudinal modes are far dominant over the height of the base spectrum. Stimulated emission supersedes the natural emission. The output curve and the spectra demonstrate that the output of the monitoring diode does not rise in proportion to the light power but increases by the growth of the longitudinal modes. The rapid rise of the output clarifies the fact that amplification of light by reciprocating between the cleavage ends of the active layer in the state having the longitudinal modes is indispensable for the returning light to have an influence on the emission performance and to change the light power. In this case, although the driving current of light source is constant, the emission condition (emission performance) varies, when the returning light enters the light source.

The change of the emission performance can be detected either by observing the output of the monitoring diode with the driving current kept constant, or by observing the driving current with the output of the monitoring diode kept constant. Above is the improvement of the light source.

Next the rotation of polarization planes in a fiber will be explained together with the improvements for preventing the rotation of polarization from disturbing the measurement. Polarization of light beams accidentally rotates in single mode fibers composing a fiber coupler or a fiber coil. A single mode fiber has no function for suppressing the rotation of polarization. A gyroscope deduces an angular velocity by letting a clockwise beam and counterclockwise beam interfere with each other. But if the polarization planes are not the same, the beams will not interfere sufficiently. Two beams with polarization planes perpendicular to each other do not interfer at all. The fundamental structure of this invention of FIG. 1 suffers from the drift of output due to the rotation of polarization, since the rotation of polarization reduces the intensity of interference light beams. The drift of output owing to the polarization rotation can be eliminated by interposing a polarizer 3 and a depolarizer 20 or 21 in the fiber paths as shown by FIG. 7 or FIG. 8.

Furthermore, if the rotation of polarization must be fully forbidden, the whole of the optics of a gyroscope shall be composed with fibers having the function of maintaining polarization planes. Thus the single-mode fibers shall be displaced by polarization maintaining fibers (or birefringent fibers). The polarization planes could be maintained in the fibers. No rotation of polarization occurs. Then the light beams emitted from the light source propagate with the same polarization into any optical parts. The clockwise beam and the counterclockwise beam interfere completely. The full interference forbids the drift of output or the change of the scale factor. Furthermore, the maintenance of polarization planes induces no loss of light beams due to the rotation of polarization. All beams effectively contribute to the generation of signals. No occurrence of polarization rotation allows to fabricate a gyroscope with high sensitivity. As clarified before with reference to FIG. 15, the rotation of polarization is fully prevented by fabricating the whole of fibers of a gyroscope with polarization maintaining fibers (birefringent fibers). The fiber coil and fiber couplers are all produced with polarization maintaining fibers. Fabrication with birefringent fibers has several advantages. One advantage is the prevention of the rotation of polarization, as explained so far. Another advantage is the prevention of occurrence of optical path difference between the clockwise beam and counterclockwise beam owing to the difference of the polarization. Because the polarization planes of both propagating beams are kept constant, the optical paths become exactly equal for both propagating beams. The optical path lengths are the same for the both spreading beams.

Besides birefringent fibers, another means is also available for assigning the polarization maintaining effect to all parts. All parts shall be produced with glass, dielectric or semiconductor. The glass, dielectric or semiconductor shall be provided with anisotropic light waveguides for prohibiting the polarization from rotating. A fiber coil can be replaced by a coiling waveguide fabricated in a winding path on a glass substrate or semiconductor substrate by photolithography. A beam divining-and-integrating device can be obtained by producing bisecting paths on a dielectric substrate. It is to be understood that a gyroscope which makes no use of fibers is also contemplated by the present invention. The gyroscope may be called rather an interferometer than a fiber-optic gyroscope. The same principle bases the interferometer, too.

On the contrary, fiber couplers and a fiber coil can be fabricated with single-mode fibers. Use of depolarizers enables the single-mode fiber gyroscope to avoid the difficulty of rotation of polarization. The depolarizer may be interposed either between the fiber coil and the coupler or between the light source and the coupler. The depolarizer is a device for converting beams with arbitrary polarization into effectively non-polarization in which polarization planes of beams distribute uniformly in all directions and the net polarization is zero. Light beams become depolarized at the device. Light is now considered as an assembly of many individual beams whose polarization cancels each other. In spite of the occurrence of rotation of polarization planes of some individual beams, the intensity of interfering beams do not feel the influence of the polarization rotation, because the individual beams weigh little in the total beams.

In conventional fiber-optic gyroscopes having a photodetector, a depolarizer is always disposed, whenever a polarizer is used therein. The polarizer defines the polarization planes of beams. The depolarizer prevents the intensity of interfering beams from fluctuating due to the rotation of polarization.

Unlike conventional gyroscopes, this invention succeeds in accomplishing equivalent effects only by a depolarizer. Curtailing a polarizer is an inherent feature of this invention which makes use of a light source as a detector. The clockwise spreading beam and counterclockwise spreading beam return the light source and interact with the light source. The output of the interaction is extracted by the change of driving current, bias voltage of the light source or by the change of the photocurrent of the monitoring diode. However, the light source generally interacts only with light beams having a particular polarization plane. The light source does not interact with other beams having other polarization planes. Namely, the light source which acts as a detector in this invention has the selectivity of polarization. Thus the light source has also the function of a polarizer. This, invention enables a depolarizer to eliminate the malfunction due to the rotation of polarization without a polarizer.

Of course an insertion of a polarizer is also effective for high precision measurement of angular velocity in the gyroscope of this invention. In is version, this invention enjoys an advantage over conventional fiber-optic gyroscopes. Conventional gyroscopes required interposing a polarizer at a fiber path between a first coupler and a second coupler. Otherwise, the progressing beams from the light source and the regressing beams could not have the same polarization. The interposition demands a difficult operation of cutting a fiber midway and combining a polarizer with two cut ends of the fiber. On the contrary, this invention allows a polarizer to be interposed in a space between the light source and the front end of a fiber, since the position of the polarizer is sufficient to let the polarization of the regressing beams coincide with the polarization of the progressing beams. There is a lens for converging beams on an incident end of a fiber between the fiber end and the light source. The light beams propagate in a free space. The interposition in the free space curtails the operation of cutting a fiber and connecting a polarizer to cut ends of the fiber. For example, FIG. 17, FIG. 18, and FIG. 19 show easy disposition of a polarizer at a position along a beam line in a free space. The mount of the polarizer can facilely be done by attaching a planar polarizer to a lens holder.

Furthermore, the use of birefringent material is also substantially available to polarize the beams. Instead of a polarizer, birefringent material can exclude either ordinary beams or extraordinary beams out of the optical path by the action of birefringence. FIG. 20 shows an example of a light source in which a birefringent plate is attached to a front opening of a cap as a window. The birefringent window plays roles of both sealing the cap and selecting beams by polarization.

FIG. 21 denotes another example of mounting of birefringent material in the optical path. A birefringent material (52) is affixed to a front end of a ferrule (51) of an optical fiber (8). Although this is only an easily practiced improvement, the device can fix the polarization and prevent the intensity of interference beams from drifting. The improvement enhances the reliability of the measurement.

Then the significance of modulating the light source by frequency $f_o$ will be explained hereafter. The modulation of the light source contributes to discerning the direct back light from the returning signal light. The direct back light means the light emitted backward from the light source to the monitoring diode. The returning signal light denotes the light which enters the fiber coil, propagates in the coil clockwise or counterclockwise, and returns the light source. The light source is directly modulated, as shown by FIG. 23(a). As shown by FIG. 23(b), the direct back light is similar to the original wave, because little delay accompanies the back light. In contradiction to the back light, the returning light beams from the fiber coil have the wave form as shown by FIG. 23(c) due to the delay of $\tau = nL/c$, where n is a refractive index of the fiber core, L is a length of the fiber coil, and c is the light velocity in vacuum. The delay of the signal allows the direct back light to be distinguished from the returning signal light. The second carrier signal ($f_o$) is deduced from the modulator of the light source. The photocurrent of the monitoring diode is synchronously demodulated by the second carrier signal. The synchronous detection by the second carrier reveals the light power of the returning light. The first carrier ($f_m$) is obtained from the phase modulator. The result of the synchronous demodulation of the photocurrent on the first carrier is expressed by an equation including terms of the phase difference of interfering beams. The phase difference is obtained by dividing the latter term by the light power.

This invention can be realized by displacing a polarizer by a polarization selecting device taking advantage of birefringence. The polarization selecting device is defined as a device for separating a beam into two beams having different polarization planes perpendicular to each other. The polarization selecting device is made from a birefringent crystal by cutting the crystal in suitable face angles to the crystallographical structure. If light beams enter the birefringent crystal at a pertinent angle, the beams will be separated spatially into extraordinary beams and ordinary beams.

The polarization selecting device is newly introduced into the fiber-optic gyroscopes by this invention. Since this invention lacks the independent photodetector, the polarization selecting device can act as a polarizer effectively. The polarization selecting device is a new optical part which is first required by this invention. Thus its principle, definition or function must be clarified at first.

Birefringence is optical anisotropy accompanying crystals with low symmetry, e.g. uniaxial crystals, biaxial crystals. A uniaxial crystal has three perpendicular optical principal axes. Two axes of the three are symmetric, normal axes. The third axis is an anisotropic axis. The anisotropy is called uniaxial anisotropy. The anisotropic axis may be referred to as an optical axis in short hereafter. Extraordinary beams are defined as beams having polarization planes parallel with the anisotropic axis. Ordinary beams are defined as beams having polarization planes perpendicular to the anisotropic axis. When the Z-axis is taken along the anisotropic axis in a birefringent crystal, the beams having polarization in Z-direction are extraordinary beams and the beams having polarization in XY-plane are ordinary beams. The progressing direction of light beams is denoted by a vector K. K is a wave vector having the length of $2\pi/\Lambda$ and having a definite direction. Here the length is insignificant. " $\|$ " is a symbol for signifying parallelism of the members on both sides.

When a beam enters a birefringent material along Z-axis (anisotropic axis)($K \parallel Z$), two beams with different polarization (X and Y) are all ordinary beams. No abnormality happens regarding refractive index. When a beam enters a birefringent crystal along Y-axis ($K \parallel Y$), the beam splits into an X-polarization beam and a Y-polarization beam. In general when a beam progresses in XY-plane ($K \perp Z$), the beam is divided into two beams with different polarization. One is an ordinary beam and the other is an extraordinary beam. The different beams with different refractive index progress at different phase velocity in the crystal. However, this is only a separation of phase. Two beams advance in the same path. No spatial separation occurs between the ordinary beam and the extraordinary beam. This is the geometry (K⊥Z) of an amplitude modulator of light making use of birefringent crystal. Another example of the geometry (K⊥Z) is a depolarizer. A depolarizer combines two birefringent crystals with anisotropic axes perpendicular to the progress of beams. The geometry may be most prevalent in optical parts using birefringence.

Otherwise, this invention demands a spatial separation as well as a phase separation from a birefringent crystal. FIGS. 27(a)–27(b) and FIG. 28 show the geometry of the birefringent material this invention employs. The birefringent material is a uniaxial crystal. The anisotropic direction (optical axis) is denoted by Z-axis. The crystal has been cut into a rectangular solid. A front surface and a rear surface are parallel. The anisotropic axis inclines at 45 degrees to the surfaces. A beam enters the crystal from the front surface perpendicularly. The beam splits into two beams with different polarization. One beam has the polarization with a component parallel with the anisotropic axis 107. This is an extraordinary beam 108. The other beam has the polarization perpendicular to the anisotropic axis. This is an ordinary beam. The phase velocities are different for the ordinary beam and the extraordinary beam owing to the difference of refractive index.

In addition to the phase difference, the optical paths also differ for the ordinary beam and the extraordinary beam. Ordinary beams maintain Snell's law about the refraction at boundaries. If a beam enters the crystal vertically, the ordinary beam advances along the same straight line perpendicular to the surface. However, Snell's law does not hold for the extraordinary beams. Even if a beam goes into the crystal vertically, the extraordinary beam is bent somewhat at the boundary.

The refraction is clarified in detail. In the geometry of FIG. 27(b), the progressing direction K of the beam is denoted by a unit vector $(2^{-1}, 2^{-1}, 2^{-\frac{1}{2}})$ in the coordinate (Z-axis is the anisotropic direction). Since the directions of X-axis and Y-axis can freely be determined, the beam direction is assumed to be symmetric to X- and Y-axes for simplicity.

The polarization $O_P$ of the ordinary beam is determined by the condition of the lack of Z-component and of the perpendicularity with the beam. Thus the polarization of the ordinary beam is denoted by a unit vector $(2^{-\frac{1}{2}}, -2^{-\frac{1}{2}}, 0)$. Similarly the polarization of the extraordinary beam is determined by the conditions of the perpendicularity both with K and with $O_P$. The polarization of the extraordinary beam is represented by a unit vector $(-2^{-1}, 2^{-1}, -2^{\frac{1}{2}})$. The unit vectors of $O_P$, K and $E_P$ are:

Polarization $O_P$ of ordinary beam 109 $(2^{-\frac{1}{2}}, 2^{\frac{1}{2}}, 0)$     (1)

Progressing direction K of beam 108 $(2^{-1}, 2^{-1}, 2^{-\frac{1}{2}})$     (2)

Polarization $E_P$ of extraordinary beam 108 $(-2^{-1}, 2^{-1}, 2^{-\frac{1}{2}})$     (3)

"$n_e$" is the refractive index of extraordinary beams. Namely, the beams with Z-polarization feel the refractive index $n_e$. "$n_o$" denotes the refractive index of ordinary beams. The beams with polarization in XY-plane feel the refractive index $n_o$. Z-axis is the anisotropic direction. General expression of refractive index N is given to an arbitrary beam with the unit polarization vector (s,t,u) by:

$$N = n_o s^2 + n_o t^2 + n_e u^2 \quad (4)$$

Ordinary beams will make their way without bending in the birefringent crystal, if they shoot the crystal vertically, because the polarization $O_P$ includes no Z-component (no anisotropic component). On the contrary, extraordinary beams will not progress without bending, even if they shoot the crystal vertically, because the polarization includes Z-component. The refractive index depends upon the beam direction K (wave vector). The extraordinary beams bend a little to the direction of Z-axis at the boundary.

Originally, the beam direction K inclines at 45 degrees ($\pi/4$) to the anisotropic axis (Z-axis). If the beam bends by $\Theta$ at the boundary, the wave vector (beam direction) K inclines at $45+\Theta$ ($\pi/4+\Theta$) to Z-axis. Then the Eq.(2) for K changes a little. The polarization $E_P$ of the extraordinary beams also changes. Since $\Theta$ is a small amount, the unit polarization vector $E_P$ for the extraordinary beams is linearly approximated as $$E_P = (-2^{-1} - 2^{-1}\Theta, -2^{-1} - 2^{-1}\Theta, 2^{-\frac{1}{2}} - 2^{-\frac{1}{2}}\Theta).$$

The refractive index for the beam with the polarization is given from Eq.(4)

$$N = n_o(2^{-1} + 2^{-1}\Theta)^2 + n_o(2^{-1} + 2^{-1}\Theta)^2 n_e$$
$$(2^{-\frac{1}{2}} - 2^{-\frac{1}{2}}\Theta)^2 = 2^{-1}(n_e + n_o) + (n_o - n_e)\Theta = n_m \Theta \Delta n \quad (5)$$

where $n_m$ is an arithmetic average of two refractive indices $n_e$ and $n_o$. $\Delta n$ is the difference ($\Delta n = n_o - n_e$).

FIGS. 27(a)–27(b) and FIG. 28 illustrate the path separation by birefringence. Snell's law does not hold for extraordinary beams. However, Fermat's principle holds for extraordinary beams, because Fermat's principle has a higher general optical law. Fermat's law says that the shortest optical path is realized among many hypothetical paths connecting two points. The optical path is obtained by integrating the refractive index with length along the path. The minimum path is realized according to Fermat's principle. When the refractive index is fully isotropic, Snell's law is easily deduced from Fermat's principle.

FIG. 27 clarifies the definitions of beams. This is XY-plane. The boundary is YZ plane. This coordinate is different from the coordinate of FIG. 27(b), FIG. 29, and FIG. 30. The initial point $P(X_o, Y_o)$ lies in a first, isotropic medium of refractive index $N_o$. The final point $R(X_1, Y_1)$ exists in the second, anisotropic medium of anisotropic refractive index $N(n_e, n_o)$. $Q(O,Y)$ is a point on the boundary. A beam starts from point $P(X_o, Y_o)$, passes the boundary at point $Q(0,Y)$ and reaches point $R(X_1, Y_1)$. The problem is to determine the shortest optical paths PQR. The optical path length L of PQR is given by:

$$L = N_o \{X_o^2 + (Y - Y_o)^2\}^{\frac{1}{2}} + \{2^{-1}(n_e + n_o) + (n_o - n_e)\Theta\}$$

$$\{X_1^2 + (Y - Y_1)^2\}^{\frac{1}{2}} = N_o$$
$$\{X_o^2 + (Y - Y_o)^2\}^{\frac{1}{2}} + \{2^{-1}(n_e + n_o) + (n_o - n_e)(Y - Y_1)/X_1\}$$

$$\{X_1^2+(Y-Y_1)^2\}^{\frac{1}{2}} \tag{6}$$

Here $\Theta=(Y-Y_1)/X_1$ has been substituted in the equation. Fermat's principle says that the minimum path shall be realized among hypothetical paths. Then the path is differentiated by Y. The result must be 0.

$$\begin{aligned}\delta L/\delta Y &= N_o(Y-Y_o)\{X_o^2 + (Y-Y_o)^2\}^{-\frac{1}{2}} + \\ &\quad \{2^{-1}(n_e+n_o)+(n_o-n_e)(Y-Y_1)/X_1\}(Y-Y_1)\{X_1^2 \\ &\quad + (Y-Y_1)^2\}^{-\frac{1}{2}}+\}X_1^2+(Y-Y_1)^2\}^{\frac{1}{2}}(n_o-n_e)/X_1=0\end{aligned} \tag{7}$$

The incident angle of the beams is denoted by $\Phi$. This equation is revised to an equation regulating the relation of angles.

$$\begin{aligned}N_o\sin\Phi&-\{2^{-1}(n_e+n_o)-(n_o-n_e)\tan\Phi\}\\ &\sin\Theta+\sec\Theta(n_o-n_e)=0\end{aligned} \tag{8}$$

If it is assumed that $\Theta$ is very small, (8) is linearly approximated to $$\begin{aligned}N_o\sin\Phi&-\{2^{-1}(n_e+n_o)-(n_o-n_e)\\ &\Theta\}\Theta+(n_o-n_e)=0\end{aligned} \tag{9}$$

If beams enter the crystal at a right angle to the surface, $\Phi=0$ (Incident angle is zero). The rest becomes a quadratic equation of $\Theta$. But for small, $\Theta$, the equation is simply reduced to $$\Theta=2(n_o-n_e)/(n_e+n_o)=\Delta n/n_m \tag{10}$$

where $\Delta n=n_o-n_e$, $n_m=(n_e+n_o)/2$. The result teaches us that extraordinary beams bend toward the anisotropic axis by $\Delta n/n_m$, which is a quotient of the difference divided by the arithmetic average of refractive indexes, although the beams enter the surface at a right angle. Some textbooks describe the angle is $(n_e^2-n_o^2)/2n_en_o$ which is a quotient of the difference divided by the harmonic average of refractive indexes. However, Eq. (10) is correct perhaps.

FIG. 27($b$), FIG. 28 and FIG. 29 demonstrate the separation of extraordinary beams from ordinary beams by in a birefringent crystal. The calculation has assumed that the inclination angle of the anisotropic axis to the beams is 45 degrees. The beams with different polarization feel different refractive indexes. Thus, the beams having different polarization progress along different paths in a birefringent crystal. The beams are separated by the birefringence. When the beams are reversely refracted, the beams exit at the rear surface. Therefore, the beams become parallel with each other, when they go out from the crystal. The parallel beams are spaced apart by d. d is in proportion to the thickness of the crystal t.

$$d=2t(n_e-n_o)/(n_e+n_o)=t\,\Delta n/n_m \tag{11}$$

What have been described so far is based on the assumption that the anisotropic axis inclines to the beam line at 45 degrees and the beams enter the crystal vertically. However, this invention is not restricted by the narrow geometric conditions.

First, it is assumed that the crystal is slanted with respect to the beams. The influence of slanting on the beam separation d is considered. The incident angle $\Phi$ is no longer zero. $\Theta$ has been a refraction angle of extraordinary beams at the boundary. The refraction angle of ordinary beams is not zero. Now $\Theta_o$ denotes the refraction angle of ordinary beams. Snell's law holds for ordinary beams in a birefringent material.

$$N_o\sin\Phi=n_o\sin\Theta_o \tag{12}$$

Substituting Eq.(12) to Eq.(8), we obtain;

$$\begin{aligned}n_o\sin\Theta_o&-\{2^{-1}(n_e+n_o)-(n_o-n_e)\tan\Theta\}\sin\Theta+\sec\Theta\cdot\\ &(n_o-n_e)=0\end{aligned} \tag{13}$$

This is an exact expression between $\Theta_o$ and $\Theta$. However, this equation cannot be clearly understood as it is. This equation is further linearly approximated under the assumption of small $\Theta_o$ and $\Theta$.

$$n_o\sin\Theta_o-n_m\sin\Theta+\sec\Theta\Delta n=0 \tag{14}$$

Further for small $\Theta_o$ and $\Theta$, $$\Theta-\Theta_o=\Delta n/n_m \tag{15}$$

This result teaches that the difference of the refraction angles between the ordinary beams and the extraordinary beams is constant in spite of the slanted with respect of the crystal to the beam line.

If the crystal is slanting to the beam line, the effective thickness of the crystal increases. Thus the spatial separation of beams is also enhanced. $\psi$ denotes the slanting angel of the crystal to the beam line. The effective thickness increases to $t\sec\psi$. The separation d becomes;

$$d=t\sec\psi\Delta n/n_m \tag{16}$$

The above calculations are based on the assumption of 45 degrees of inclination between the anisotropic axis and the beam line. However, this invention is not restricted within the condition of a 45 degree inclination angle. This invention can be also applied to inclination angles other than 45 degrees. General requirements will be now considered.

Instead of 45 degrees, $\alpha$ generally denotes the inclination angle of the beam line (wave vector) to the anisotropic axis (Z-axis). In the coordinate in which Z-axis is parallel with the anisotropic direction, the polarization $O_P$ of ordinary beams, beam line K and polarization $E_P$ of extraordinary beams are expressed by;

polarization $O_P$ of ordinary beams $(2^{-\frac{1}{2}},-2^{-\frac{1}{2}},0)$ (17)

beam line K $(2^{-\frac{1}{2}}\sin\alpha, 2^{-\frac{1}{2}}\sin\alpha, \cos\alpha)$ (18)

polarization $E_P$ of extraordinary beams $(-2^{-\frac{1}{2}}\cos\alpha, -2^{-\frac{1}{2}}\cos\alpha, \sin\alpha)$ (19)

The anisotropic refractive index N of extraordinary beams is obtained from (4) by substituting the vector $E_P$ $$N=n_o(2^{-\frac{1}{2}}\cos\alpha)^2+n_o(2^{-\frac{1}{2}}\cos\alpha)^2+n_e$$

$$(\sin\alpha)^2=n_o\cos^2\alpha+n_e\sin^2\alpha=n_m+(\Delta n/2)\cos 2\alpha \tag{20}$$

$\alpha$ is the angle between the incident beam line 110 and the normal of crystal surface. The angle $\Theta$ denotes the bending angle at the boundary (inclination angle of the beams to the normal of the surface). The refractive index the extraordinary beams feel is obtained by substituting $\alpha-\Theta$ to $\alpha$ in Eq. (20)

$$N = n_m + (\Delta n/2)\cos 2\alpha + \Theta \Delta n \sin 2\alpha \quad (21)$$

This is a general expression of the refractive index of extraordinary beams. When $\alpha = \pi/4$ is substituted, Eq. (21) is reduced to Eq.(5). Substituting this expression into Fermat's equation like Eq. (6), we obtain the expression of optical path with independent variable Y. The optical path is differentiated by Y. Then the differentiated is set to be 0. In the case of vertical incidence, the bending angle $\Theta$ becomes $$\Theta = (\Delta n/n_k)\sin 2\alpha \quad (22)$$

where, $$n_k = n_o \cos^2\alpha + n_e \sin^2\alpha = n_m + (\Delta n/2)\cos 2\alpha \quad (23)$$

This is the bending angle (or refracted angle) of extraordinary beams in the case of vertical incidence. Of course, substitution of $\alpha = \pi/4$ reduces Eq.(22) to Eq.(10). The bending angle of extraordinary beams reduces in proportion to sin2 $\alpha$, when the inclination of the beam line to the anisotropic axis (optical axis in short) deviates from 45 degrees ($\pi/4$). The spatial separation d is gained by multiplying $\Theta$ by the thickness t. Namely, $d = t (\Delta n/n_k) \sin 2\alpha$ When beams enter the surface slantingly, ordinary beams are also refracted by $\Theta_o$. However, when the difference of the refracted angles is a constant value like the case of $\alpha = \pi/4$, Eq.(15) is replaced by $$\Theta - \Theta_o = (\Delta n/n_k)\sin 2\alpha \quad (24)$$

$n_m$ and $n_k$ are average of $n_e$ and $n_o$. Thus $n_k$ and $n_m$ are nearly equal to $n_e$ or $n_o$. For a general incident angle, the spatial difference d is nearly (t $\Delta n/n_m)\sin 2\alpha$. The spatial difference d is expressed by $n_e$ and $n_o$ instead of $\Delta n$ and $n_m$ as follows $$d = 2 t |(n_e - n_o)| \sin 2\alpha / (n_e + n_o) \quad (25)$$

This is the distance of ordinary beams and extraordinary beam at the rear surface of the birefringent crystal. If a light source emits light beams with various polarization directions and the beams penetrate the birefringent crystal, two beams with different polarization directions are spatially separated by the birefringence. If the divided beams enter an end of optical fiber with a narrow core, only the beams of one polarization direction shoot the core and the other beams of another polarization direction enter the cladding. The latter beams cannot enter the fiber. Only the first beams of a definite linear polarization direction can enter the core and spread in the fiber. If a core diameter is small enough, the fiber itself can select the beams with linear polarization. Thus the birefringent crystal acts as a polarizer in this case. The birefringent material positioned in front of an optical fiber is substantially a polarizer. This is a simple device without inner structure. Now $D_f$ is a diameter of the core of a fiber. If $d > D_f$, the birefringent material plays the role of a polarizer. The complete expression of the requirement is $$2t|(n_e - n_o)|\sin 2\alpha/(n_e - n_o) > D_f \quad (26)$$

The scope of $\alpha$ is determined from the dependence of sin 2 $\alpha$. The inclination of the anisotropic axis (optical axis) is not restricted at 45 degrees. In general, 25 degrees to 65 degrees are suitable for the inclination of the optical axis to the beam line.

It has been clarified that a birefringent crystal separates extraordinary beams from ordinary beams by the distance d. The ordinary beams have a definite polarization perpendicular to the anisotropic axis. The extraordinary beams have another definite polarization perpendicular to the polarization of the ordinary beams. No other beams can pass through the birefringent material except the ordinary beams and the extraordinary beams.

As shown in FIG. 30 or FIG. 31, if an optical 116 fiber is set at a pertinent position in front of the birefringent material 114, only ordinary beams 109 or only extraordinary beams 108 from light source 118 through lens 112 and birefringent material 114 enter the core 120 of the fiber. If the fiber is deviated by d in the direction of the anisotropic axis from the original beam line, the fiber receives only the extraordinary beams. If the fiber is positioned along an extension of the original beam line, the fiber receives only the ordinary beams.

FIG. 32 shows a typical shape of a birefringent crystal. The optical axis means the anisotropic axis. The separation of beams occurs in the plane including the anisotropic axis. Since the front surface 122 and the rear surface 124 are parallel, outgoing beams are parallel with ingoing beams. The separation d does not change along the beam line.

FIG. 33 shows a version having a rear surface ground slantingly by angle $\Theta$. The slanting rear surface 124 spreads the extraordinary beams. The separation d' of FIG. 33 is wider than d of FIG. 32.

A single-mode fiber has a core of a diameter of about 5 $\mu$m to 10 $\mu$m in general. If d is more than 10 $\mu$m, a fiber can select only one polarization. The distinction between ordinary beams and extraordinary beams originates from the difference of polarization. The birefringence material separates the beams by the difference of the polarization directions. The selection of either of ordinary or extraordinary beams is equivalent to the selection of polarization. Thus the birefringent device is substantially a polarizer.

Conventional polarizers forgive the beams with the special polarization passing through but completely forbid the other beams with the other polarization from penetrating. The birefringent device allows all beams to penetrate to different positions. A fiber selects one polarization owing to the spatial separation. The birefringent devices differ from the conventional polarizers in principle.

Conventional polarizers are expensive because of the difficulty of production in any cases, e.g. fiber-type polarizers or metal-dielectric multilayer polarizers. On the contrary, the polarization selecting device of this invention is easily produced by cutting birefringent crystals in suitable surfaces. Cheap polarization selecting devices enable to make inexpensive fiber-optic gyroscopes.

Furthermore, the polarization selecting device (birefringent crystal) can be interposed in a free space between the light source and the fiber beginning end, because this invention detects the interfering beams by light source itself. The simple structure dispenses with shearing of a fiber and joining the fibers to a polarizer.

FIG. 34 demonstrates a fundamental structure of the fiber-optic gyroscope of this invention interposing the birefringent material between the light source and the fiber end. Disposition of a birefringent material in a free space facilitates the fabrication of the gyroscope by reducing the number of joints.

The advantages of this invention will be explained. The biggest merit of this invention is curtailing of one beam dividing-and-combining device. Prior gyroscopes required two beam dividing-and-combining devices without exception. But only one beam dividing-and-combining device suffices for the gyroscope of this invention. Fiber-type couplers or bulk beam splitters are examples of the beam dividing-and-combining devices. It takes much money and time to fabricate fiber-type couplers or beam splitters.

A fiber-type coupler is made by eliminating overcoatings on one side of fibers, melting fiber claddings and cores, coupling two molten sides of two fibers into a body, and pulling the ends of the fibers in order to shorten the distance between two cores. The short distance enables two fibers to couple with each other through evanescent waves. However it is very difficult to treat the thin fibers of a 125 $\mu$m outer diameter with high precision. The treatment of the narrow fibers demands a fine controlling of the manufacturing conditions. Therefore, the fiber coupler is the most expensive in the parts constructing a fiber-optic gyroscope.

A bulk, discrete beam splitter may be used as a beam dividing-and-combining device. Cheap beam splitters have been used for CD players. The cheap beam splitters for CD players cannot be diverted to a fiber-optic gyroscope as it is because of the difference of requirements. The diversion demands a converging optics for letting the beams converge on the fiber core or letting the beams converge on the beam splitter. Additional parts raises the cost of the beam splitters. Hence, beam splitters are expensive. Furthermore, it would take much time to adjust the lens of the converging optics of a beam splitter. Thus, the use of a beam splitter is not advantageous. In general, the beam dividing-and-combining devices have stood on the serious ground of high cost of conventional gyroscopes. Reducing one beam dividing-and-combining device allows this invention to fabricate inexpensive gyroscopes.

Besides, this invention also dispenses with a photodetector. Omission of a photodetector decreases the production cost of this invention further. This invention eliminates a photodetector which has been considered to be indispensable to a fiber-optic gyroscope and measuring the intensity of the interfering beams by the change of the emission performance of the light source. This is entirely a novel invention.

Improving a superluminescent diode or a laser diode, this invention obtains new light emitting devices with high sensitivity for returning light beams and with a short coherent length. The light emitting devices provide the gyroscope with high sensitivity for the rotation.

This invention denies the traditional, rigorous requirement that the polarizer should be interposed in a fiber between two couplers. The polarizer can be interposed in a free space between the light source and the fiber end. Disposition of a polarizer in a free space enhances the freedom of choice of polarizers and birefringent materials.

BRIEF DESCRIPTION OF THE DRAWINGS

FIG. 8 is a schematic view of a fourth embodiment with a polarizer and a depolarizer;

FIG. 9 is a schematic view of a fifth embodiment with a polarizer and a polarization maintaining fiber;

FIGS. 13a-1 through 13b-3 are graphs explaining emission spectra of a light source and coherent lengths of light, wherein light, wherein FIGS. 13a-1 through 13b-3 shows the graphs for an ideal semiconductor laser, wherein FIG. 13 is a diode, wherein FIG. 13a-1 spectrum of the light such that the abscissa is a wavelength and the ordinate is the intensity, and FIG. 13 demonstrates the spatial coherency of beams, wherein FIG. 13a-2 and 13b-2 shows the typical graphs for a superluminescent diode. a-2 is a spectrum of the superluminescent diode. b-2 is the spatial coherency, and is the graphs for a multi-longitudinal mode laser, wherein a-3 is the spectrum of the light beams, and FIG. b-3 is the spatial coherency of the light beams;

FIG. 18 is a sectional view of a light source, i.e. a holder, a mount, a ferrule of a fiber of the embodiment having the polarizer or the birefringent material between the light source and the lens, and so on;

FIG. 19 is a sectional view of another light source, i.e. a holder, a mount, a ferrule of a fiber of the embodiment having the polarizer or the birefringent material before the light source, and so on;

FIG. 22 is an explanatory figure of a light emitting device, a monitoring diode, and a fiber coil, which shows that returning beams from the fiber coil as well as the direct beams from the light emitting device enter the monitoring diode;

FIG. 23(a) 23(c) are figures of waves for explaining that both the returning beams and direct beams enter the monitoring diode and that the returning beams retard by $\tau$, wherein in FIG. 23(a) is the waveform of the driving current of the light source, FIG. 23(b) is the waveform of the direct beams and FIG. 23(c) is the waveform of the returning beams;

FIG. 35 is a perspective view of a fiber-type polarization selection device;

FIG. 36 is a sectional view of a light source module adopted in an embodiment of this invention;

DETAILED DESCRIPTION OF THE PREFERRED EMBODIMENTS

Figure 1:
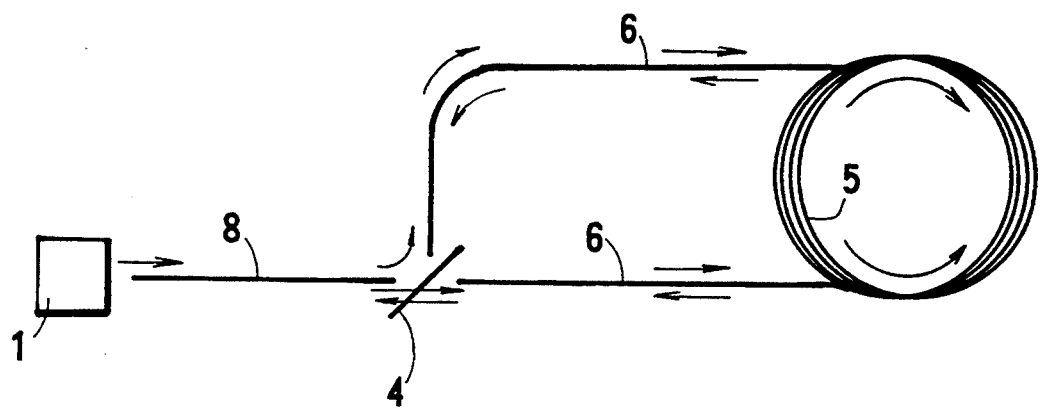
FIG. 1 is a schematic view of a fundamental structure of a fiber-optic gyroscope of this invention.

A fundamental structure of the fiber-optic gyroscope of this invention is shown by FIG. 1. The fundamental one can be transformed into various versions along with the idea of this invention. Embodiments will be demonstrated in accordance with referring figures.

[EMBODIMENT 1]

Figure 5:
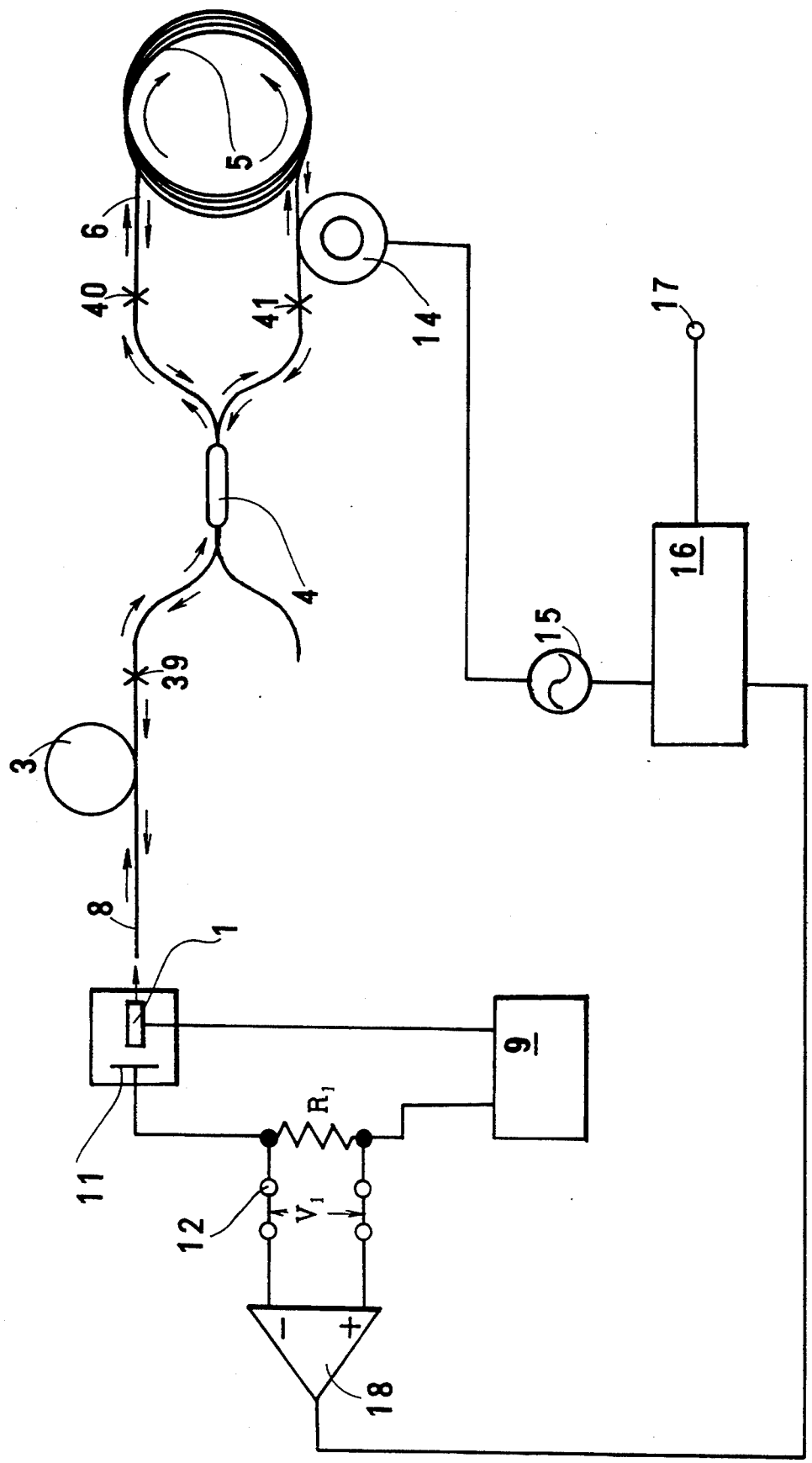
FIG. 5 is a schematic view of the whole of a first embodiment of this invention.

FIG. 5 shows an embodiment of this invention. This is an example of a gyroscope of phase-modulation type. An APC (Automatic Power Controller) circuit (9) drives a light emitting device (1) to emit light beams by supplying a pertinent current. The light beams emitted from the light emitting chip (1) enter an end of an optical fiber of a fiber-type polarizer (3). The polarizer (3) can be selected arbitrarily among a bulk crystal polarizer, metal-dielectric multilayer polarizer, a fiber-type polarizer, etc. Here, a fiber-type polarizer is depicted in FIG. 5. The backward emitting beams are sensed by a rear monitoring diode (11). Another end of the fiber-type polarizer is connected to an end of a fiber coupler (4) (beam dividing-and-combining device) at a junction (39). Another two ends (40) and (41) of the fiber coupler (4) are connected to ends of a fiber coil (5). The fiber coil (5) is made by winding a single-mode fiber around a bobbin. A phase-modulator (14) is equipped with one end of the fiber coil (5). A sine wave oscillator (15) applies AC modulation voltage of sin $\Omega$t to the phase-modulator (14). The phase-modulator (14) gives the spreading beams the phase-modulation of sin $\Omega$t. This is an ordinary structure of a phase-modulated gyroscope.

The monitoring photodiode (11) monitors the light power emitted backward from the light source (1). The output of the monitoring photodiode (11) is connected via a resistor $R_1$ to the APC circuit (9) for controlling the driving current of the light source from the APC circuit (9). In this embodiment, a signal is obtained by the voltage $V_1$ between terminals (12) of the resistor $R_1$. The signal is amplified by a differential amplifier (18) and is synchronously demodulated by a synchronous detector (16). A carrier which determines the timing of the synchronous demodulation is supplied by the sine wave oscillator (15). The result of the synchronous detection is output at a terminal (17).

The light beams emitted from the light source (1) are linearly-polarized by the fiber-type polarizer (3). The polarized beams are divided into halves by the fiber coupler (4) (beam dividing-and-combining device). The divided beams enter both ends of the fiber coil (5) and spread clockwise and counterclockwise many times in the single-mode fiber coil (5). When the fiber coil is rotating, a phase difference $\Delta\Theta$ occurs between the clockwise beam and the counterclockwise beam. The beams with the phase difference $\Delta\Theta$ are again united at the beam dividing-and-combining device (4). The united beams pass through the polarizer (3) in the reverse direction and return the light source (1). Part of the returning beams further reach the monitoring photodiode (11). Two beams interfere with each other at the monitoring photodiode (11). The intensity of the interfering beams is sensed by the monitoring photodiode (11).

Because the light beams have been phase-modulated, the intensity of the interfering beams includes a series of harmonics of frequencies of $m\Omega/2\pi$ with coefficients of the m-th Bessel functions. Here $\Omega$ is the phase-modulation frequency. "m" denotes integer; m=1 is a fundamental component, m=2 is the second harmonics, m=3 is the third harmonics and so on. Then the output of the monitoring diode is synchronously demodulated by the fundamental carrier of frequency $\Omega/2\pi$ or by higher order harmonic carriers of frequencies $m\Omega/2\pi$. The synchronous detection gives the result including the phase difference $\Delta\Theta$ in the form of sin $\Delta\Theta$.

Namely, the detection of the phase difference is carried out by the ordinary signal processing circuit similar to the conventional phase-modulation gyroscopes. In addition to the fundamental wave, if the second harmonics or fourth harmonics are detected synchronously by $2\Omega/2\pi$ or $4\Omega/2\pi$, important parameters can be well stabilized. The power of light source is controlled, the intensity of phase modulation is adjusted at a suitable level and the scale factor is stabilized. Such optimization of parameters by second harmonics has been also done in prior phase-modulation gyroscopes. The functions will be explained by FIG. 12 later.

[EMBODIMENT 2]

Figure 6:
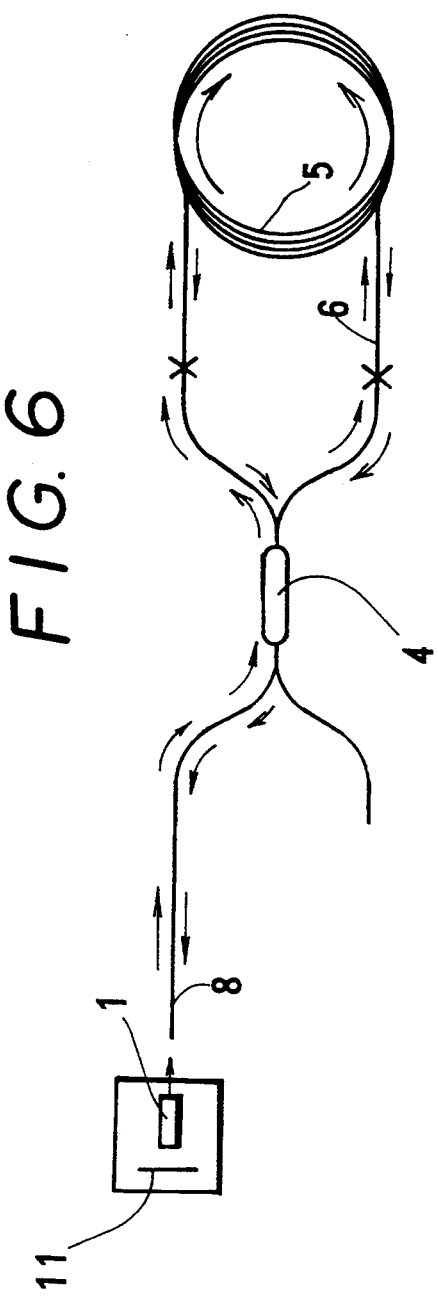
FIG. 6 is a schematic view of a second embodiment without a polarizer.

FIG. 6 shows another embodiment. The embodiment is approximately as same as the embodiment 1 except non-existence of a polarizer. Other components are omitted from FIG. 6, because they are quite similar to FIG. 5. A light source (1) has the selectivity of polarization. The light source (1) emits the beams with definite linear polarization. The selectivity of polarization of the light source enables the gyroscope to reduce a polarizer. The returning beams have an influence on the emission performance through the interaction between the beams just occurring in the active layers and the beams returning from the fiber coil. The interaction requires the coincidence of the polarization of the returning beams with the occurring beams. In other words, other components having polarization planes different from the polarization of the occurring beams do not have the influence upon the emission performance of the light source. Because the light source emits only the beams with definite linear polarization, the light source itself plays the role of a polarizer. Therefore, the light source detects only the beams with the polarization of the occurrence beams.

The selectivity of polarization depends on the property of the light source. Semiconductor laser diodes generate linearly-polarized beams. Thus, laser diodes have high selectivity of polarization. Laser diodes possess the function of polarizer. Most laser diodes enjoy the selectivity of polarization. Some of superluminescent diodes generate beams with definite linear polarization at a moderate driving current. Almost all superluminescent diodes emit beams with definite linear polarization at a high driving current. Omission of polarizer will not lead to the occurrence of phase difference due to the discrepancy of polarization in the case of the light source with high selectivity of polarization.

[EMBODIMENT 3]

Figure 7:
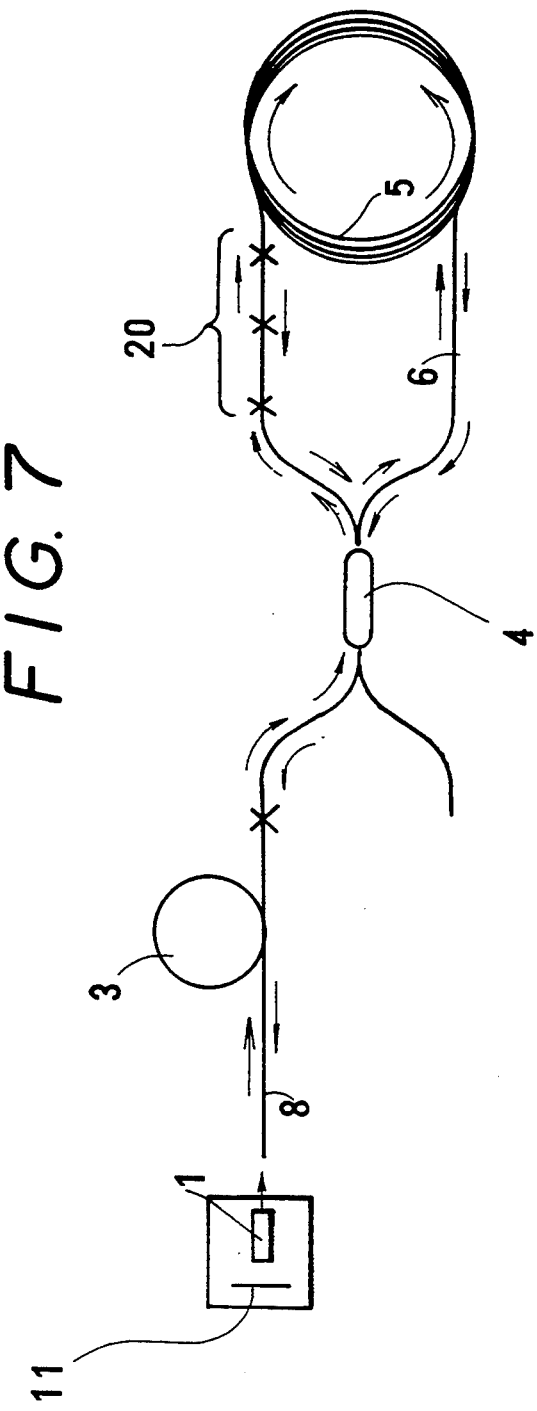
FIG. 7 is a schematic view of a third embodiment with a polarizer and a depolarizer.

Third embodiment is shown by FIG. 7. This is an improvement of embodiment 1 of FIG. 5 which interposes a polarizer (3) at the initial fiber path. It is desirable to make the fiber coil (5) with a polarization maintaining fiber for keeping the polarization planes of the spreading beams in a definite direction in FIG. 5. FIG. 7 proposes the interposition of a depolarizer (20) between a coupler (4) and a single-mode fiber coil (5). The depolarizer (20) converts any polarization state into non-polarization state in which polarization of all beams cancels out and the sum of the polarization vectors is zero. Even if the rotation of polarization happens in the single-mode fiber coil, half power of beams can pass through the polarizer (3) without fail. In general, a depolarizer can be fabricated by joining two birefringent materials with their optical principal axes inclining at 45 degrees each other. Here two polarization maintaining fibers (birefringent fibers) are spliced with the principal axes twisting at 45 degrees. The joints of fibers are denoted by x in FIG. 7.

[EMBODIMENT 4]

FIG. 8 exhibits fourth embodiment. A fiber coil (5) is made from a single-mode fiber. The position of a depolarizer (21) is different from embodiment 3 of FIG. 7. The depolarizer (21) is interposed between a fiber coupler (4) and a fiber-type polarizer (3). The function is similar to embodiment 3. The depolarizer (21) consists of two polarization maintaining fibers gluing together with the optical principal axes inclining at 45 degrees.

[EMBODIMENT 5]

Fifth embodiment of FIG. 9 is obtained by simplifying embodiment 4. Instead of the depolarizer (21), a birefringent fiber (22) joins with an end of a fiber-type polarizer (3) with the optical principal axis inclining at 45 degrees to the principal axis of the polarizer. Since a polarizer forgives only one linearly-polarized beam to pass through, one birefringent material cohering to the polarizer with a 45 degree twisting angle has a function as a depolarizer. This embodiment curtails one birefringent fiber.

[EMBODIMENT 6]

Figure 10:
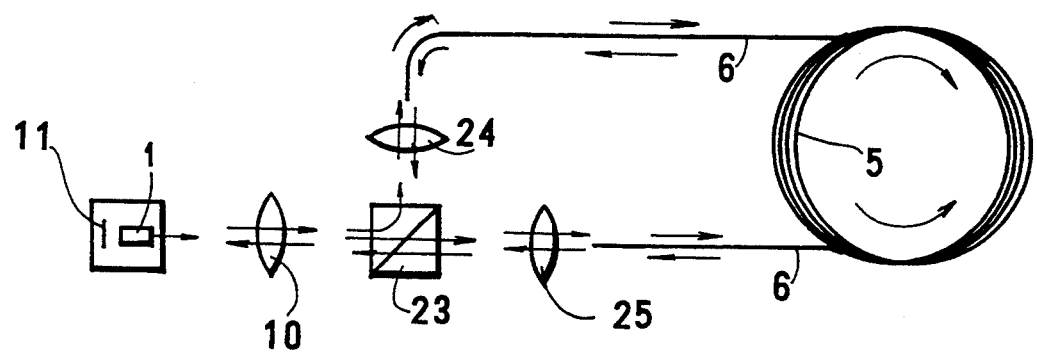
FIG. 10 is a schematic view of a sixth embodiment with a beam splitter as a beam dividing-and-combining device.
Figures 1, 13A:
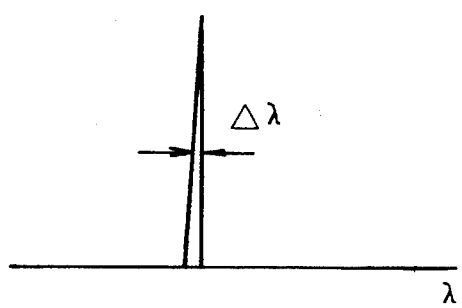
Figures 1, 13B:
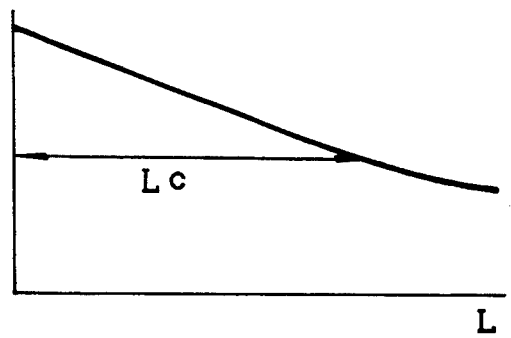
Figures 2, 13A:
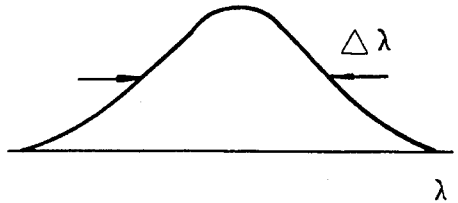
Figures 2, 13B:
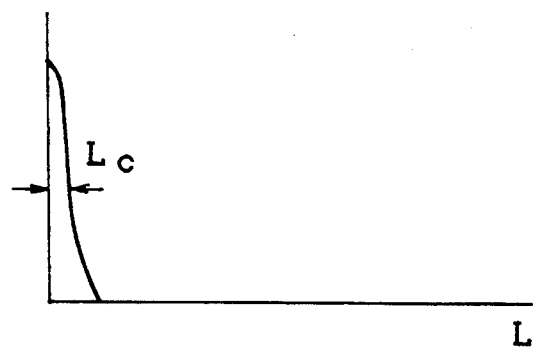
Figures 3, 13A:
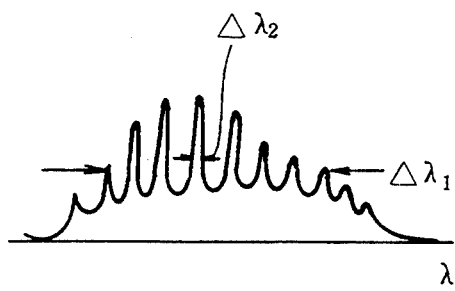
Figures 3, 13B:
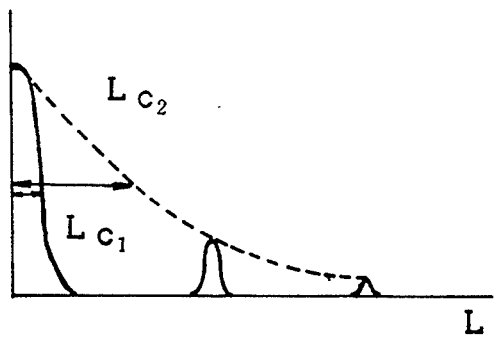

FIG. 10 shows another embodiment. A bulk, discrete beam splitter (23) is adopted as a beam dividing-and-combining device. The beams emitted by a light source (1) are divided by the beam splitter (23). The beams dispersing from the light source (1) are transformed into parallel beams by a lens (10). The beams enter the beam splitter (23). Half of beams pass through the beam splitter (23) and converge by a lens (25) to an end of a fiber coil (5). Another half beams reflect at the beam splitter (23) and converge by a lens (24) to another end of the fiber coil (5). The beams propagate in the fiber coil clockwise or counterclockwise. The beams are integrated again at the beam splitter (23), penetrate the lens (10) and go back to the light source (1). Part of the returning beams further reach a rear monitoring photodiode (11). The disposition of FIG. 10 resembles FIG. 3 which has not been put into practice because of the occurrence of path difference at the beam splitter. However, unlike FIG. 3, this embodiment is fully immune from the difficulty derived from the occurrence of path difference between the clockwise beams and counterclockwise beams due to the mirror-symmetric disposition of the photodetector (11) and the light source (1) with regard to the beam splitter.

[EMBODIMENT 7]

Figure 11:
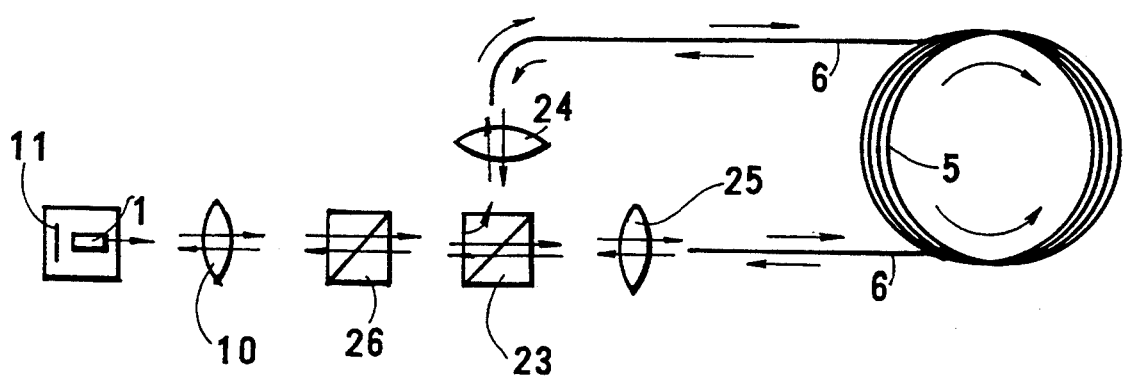
FIG. 11 is a schematic view of a seventh embodiment with a beam splitter and a polarizer.

FIG. 11 shows an improvement of FIG. 10. This embodiment employs a polarizer (26) between a light source (1) and a beam splitter (23). Such a polarizer has been also used in prior gyroscopes. The polarizer (26) lets only the returning beams with the polarization similar to the occurring beams interact with the light source (1).

[EMBODIMENT 8]

Figure 12:
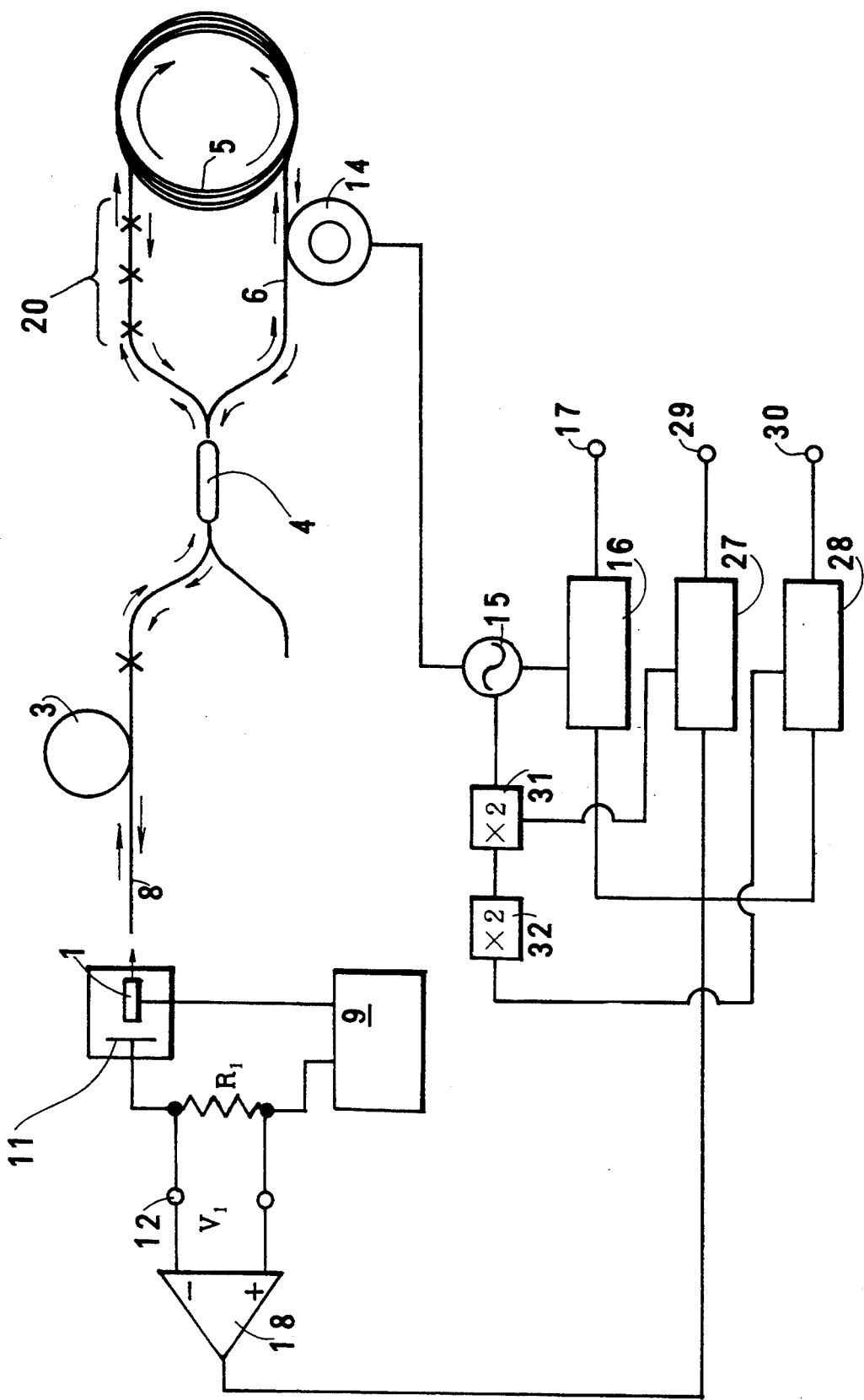
FIG. 12 is a schematic view of an eighth embodiment which modulates light beams by phase and demodulates synchronously fundamental wave and harmonics waves.

FIG. 12 shows an improvement of the signal processing. Embodiment 1 of FIG. 5 can obtain only the fundamental signal by the synchronous detection by the fundamental carrier. This embodiment can detect second harmonics and fourth harmonics by synchronous demodulation in addition to the fundamental wave. Three synchronous detectors (16), (27), and (28) are provided in the embodiment. The first synchronous detector (16) deduces the fundamental signal (17) by detecting the output of the differential amplifier synchronously by the modulation frequency $\Omega/2\pi$. The second detector (27) extracts the second harmonic signal (29) by detecting the output of the amplifier (18) by the 2nd harmonic carrier. The 2nd harmonic carrier is produced by a twice-multiplier (31) from the basic carrier of a sine wave oscillator (15). The fourth carrier can be obtained by a twice-multiplier (32) from the second harmonic carrier. The phases of the carriers have adjusted to coincide with the phases of the harmonics signals. Instead of multiplying the modulation frequency, each order of carriers can be otherwise obtained by another way. An oscillator originates high frequency signal. The modulation frequency of a phase-modulator (14) is obtained by dividing the original signal several times. A few times of dividing will give the synchronous detectors (28), (27) and (16) the fourth order carrier, the second order carrier and the fundamental carrier respectively.

The other parts are similar to that of FIG. 5. A differential amplifier (18) amplifies the voltage $V_1$ which is in proportion to the photocurrent of a monitoring diode (11). The second harmonics and the fourth harmonics can adjust the light power and the modulation depth. In this case, the harmonic signals shall be fed back to an APC circuit (9) for stabilizing the power of the light source. In stead of adjusting the light power, the quotient of the fundamental signal (17) divided by the second harmonics (29) or the fourth harmonics (30) will designate the phase difference $\Delta\Theta$ in the form of $\tan \Delta\Theta$ independent of the light power.

Furthermore, if the strength of phase modulation is adjusted so as to extinguish the second harmonics, the depth of phase modulation can be kept to be a constant value. The output of the monitoring diode includes an infinite progression of harmonics with coefficient of Bessel functions. The second harmonics has coefficient $J_2(\xi)$, where $\xi$ is the modulation constant. Extinguishing the second harmonics ($J_2(\xi)=0$) leads to $\xi=5.2$.

[EMBODIMENT 9]

Figure 14:
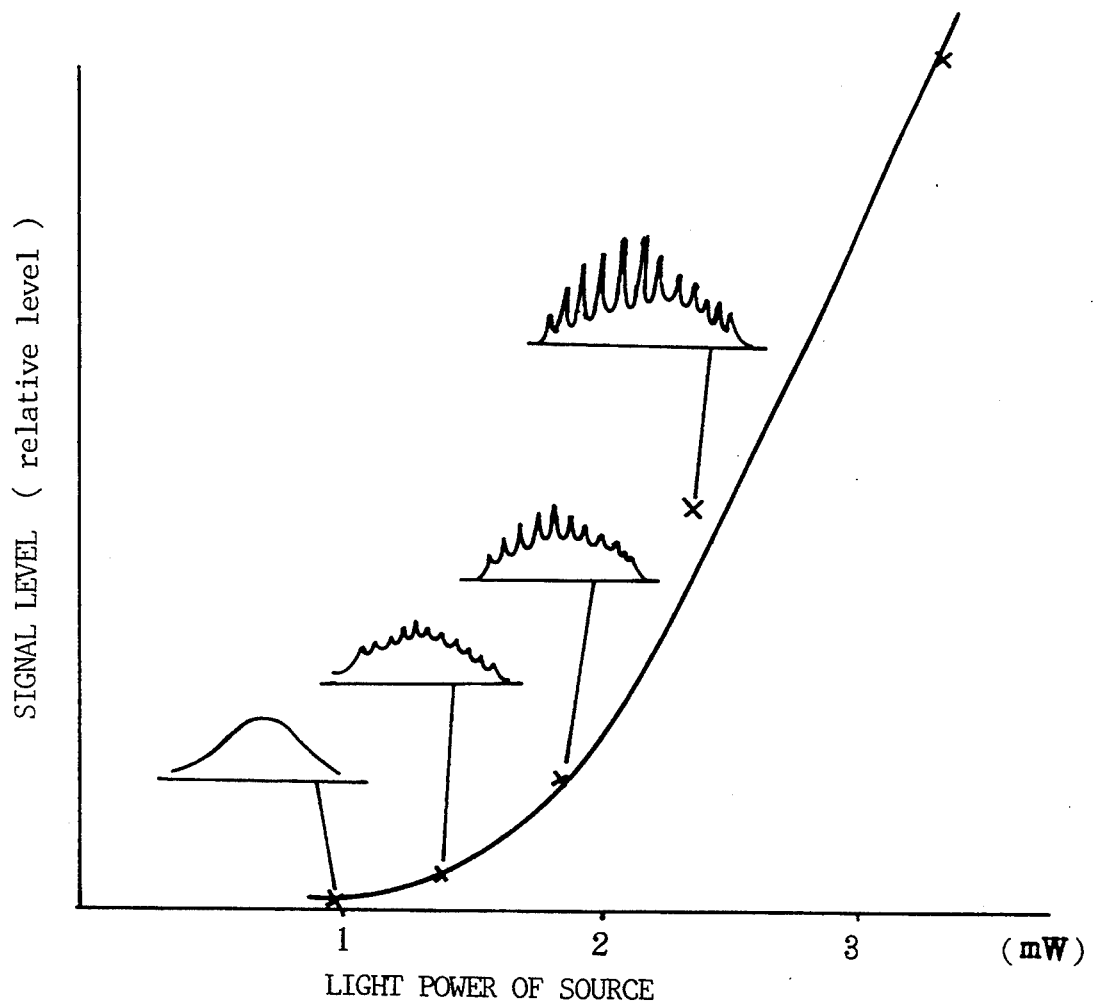
FIG. 14 is a graph showing the relation between the light power and the intensity of interfering beams when the light source is a superluminescent diode which has been produced by depositing an antireflection layer on the ends of laser diode as a light source.

A next problem relates to the light source. As previously clarified, this invention prefers a light source having multilongitudinal modes in spectrum accompanied by stimulated emission. The light emitting device having the intermediate property between an ideal laser diode and an ideal superluminescent diode is suitable for the light source of this invention. There is not such a light emoting delve on the market at present. It is impossible to find such a light emitting device on sale. However, a suitable light source can be gained by improving the current light emitting devices. For example, a suitable light emitting device can be fabricated either by reducing the AR coating at the ends of a superluminescent diode or by increasing the driving current to some extent. The preparation of the pertinent light sources has already been clarified by FIG. 14. A superluminescent diode can be converted into a preferable device with a longer coherent length and many longitudinal modes in spectrum.

[EMBODIMENT 10]

A pertinent light emitting device can otherwise be obtained from a laser diode with a single longitudinal mode. The longitudinal mode is stable in a laser diode, only when the driving current is stable. Stability of the longitudinal mode demands the stability of the driving current. When the driving current is modulated at high frequency, a laser diode yields multilongitudinal modes.

K. Y. Lau, Ch. Harder & A. Yariv, "Longitudinal mode spectrum of GaAs injection laser under high-frequency microwave modulation", Appln. Phys. Lett. vol. 43(7), (1983)p619.

Lau et al. wrote that when modulation current of the frequency higher than 1 GHz is supplied to a laser diode, some longitudinal modes appear in proportion to the intensity of modulation. 100% of modulation intensity reveals plural longitudinal modes whose peaks are as high as half of the height of the main peak of the basic longitudinal mode. The appearance of multilongitudinal modes has been a serious problem for reducing the transmission band width in optoelectronic communication so far.

However, this invention makes advantage of the property positively and effectively. Namely, a laser diode is converted to a suitable light source of the gyroscope of this invention by modulating the laser diode at high frequency in order to increase longitudinal modes. The multilongitudinal modes broaden the emission spectrum. The coherent length becomes short effectively due to the wide spectrum.

Longitudinal modes have sharp subpeaks. The effective narrowness of the subpeaks facilitates the stimulate emission. Returning beams affect the emissions performance of a laser diode because of the narrow peaks. The intensity of the returning beams can be indecently sensed by measuring the back emitting beams from the light source by the monitoring photodiode with the amplitude of driving current which is kept to be constant. Otherwise, the intensity of the returning beams is measured by maintaining the light power at a constant level and by monitoring the change of the amplitude of AC driving current. The high frequency modulation of a laser diode reduces the coherent length without suppressing the interaction between the returning beams and the occurrence beams. In this case the beams can be phase-modulated. The frequency of source current modulation for reducing coherency is much higher (several of GHz) than the frequency of the phase-modulation (from kHz to hundreds of kHz). The phase modulation signals can easily be deduced from the original signals of the monitoring diode or the light emitting device.

[EMBODIMENT 11]

Figure 15:
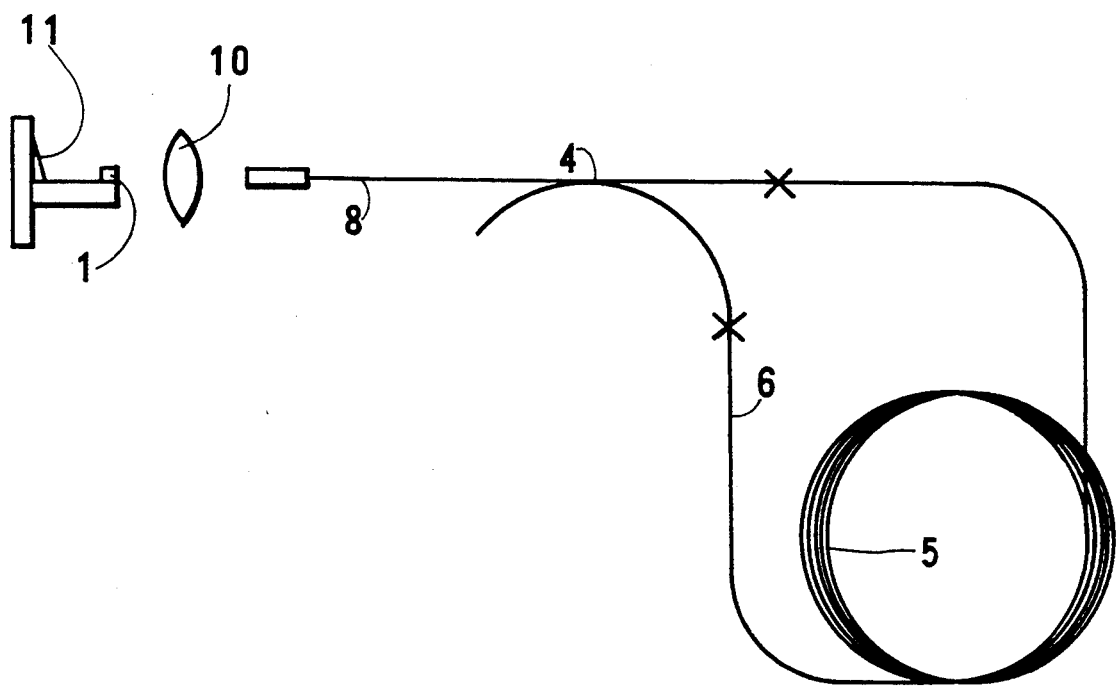
FIG. 15 is a schematic view of an embodiment which is constructed with polarization maintaining fibers for endowing all optical paths with the function of maintaining polarization.

Another embodiment is shown by FIG. 15. All fibers are replaced by birefringent fibers (PM fibers). The fiber coil is made from a birefringent fiber (polarization maintaining fiber). The fiber coupler is also produced with birefringent fibers. Other parts are similar to embodiment 1 of FIG. 5. The beams emanating from the light source are converged by a lens (10) to an end of the polarization maintaining fiber (8). The beams spread in PM fibers, keeping definite polarization in accordance with the anisotropy of the birefringent fiber. The beams are divided into halves by a PM fiber coupler (4), maintaining the polarization by the anisotropy of the PM fibers. The divided beams spread in a PM fiber coil (5) clockwise and counterclockwise. Since the polarization does not rotate in the PM fibers, the clockwise-spreading beam and the counterclockwise-spreading beam propagate in the same paths. The effective optical paths are exactly equal to both the clockwise beam and the counterclockwise beam. The junctions of fibers are denoted by x. The clockwise beam and counterclockwise beam are reunified by the fiber coupler (4). The unified beams return to a light source (1). The returning beams interfere with each other in the light source (1). The light source is affected by the interfering beams. The occurring beams interact with the returning beams. The back emitting beams are monitored by a photodiode (11) mounted on the bottom of the light source case. A signal can be obtained from the driving current, driving voltage of the light source (1) or photocurrent of the photodiode (11).

[EMBODIMENT 12]

Instead of optical fibers, glass and dielectrics, semiconductor crystal can construct a ring interferometer which can maintain a definite linear polarization plane of beams in overall optical paths. The principle is similar to that shown by FIG. 15. But this example employs no fibers. A spiral path can be fabricated on a dielectrics by forming a vortex light waveguide by photolithography. A coupler can be obtained by forming two light waveguides on a dielectrics which couple with each other by evanescent waves. Fortunately, two-dimensional waveguides fabricated on glass or dielectrics have a function for maintaining a definite linear polarization of beams owing to the two-dimensional anisotropy. The geometric anisotropy of waveguides gives different phase constants to the beams with the polarization parallel with the surface and the beams with the polarization perpendicular to the surface.

[EMBODIMENT 13]

Figure 16:
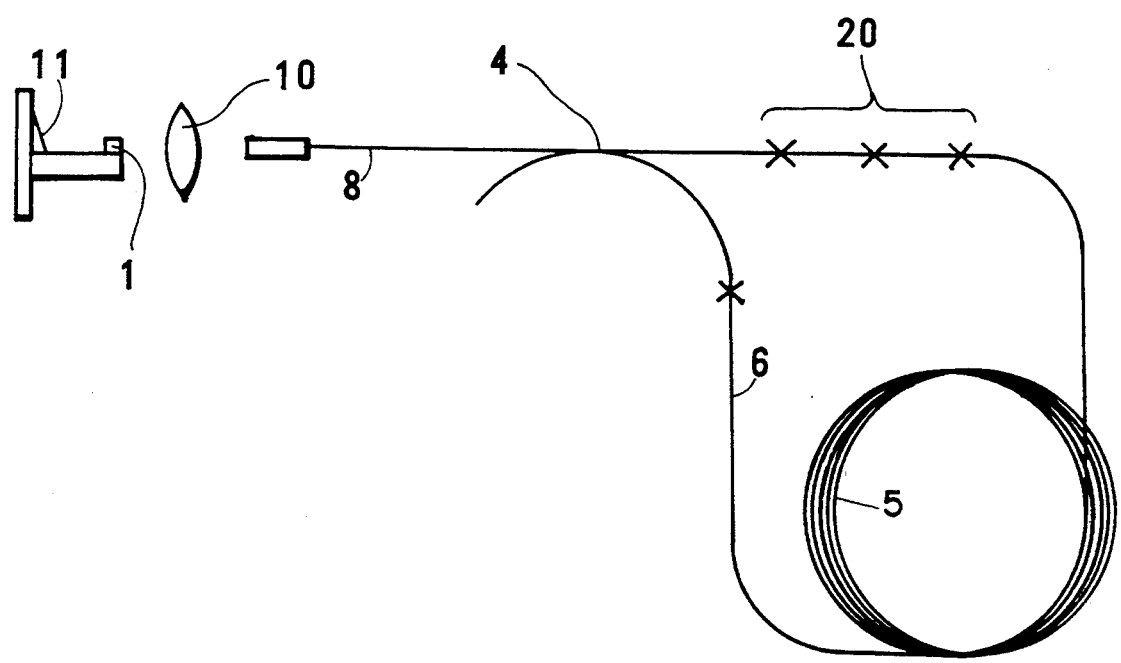
FIG. 16 is a schematic view of another embodiment in which a depolarizer is interposed between the coupler and the fiber coil.

All paths are built with single-mode fibers as shown in FIG. 16. A fiber coupler and a fiber coil are made from single-mode fibers. A depolarizer (20) is interposed between the coupler and the coil. x's denote junctions of fibers. The depolarizer (20) converts any polarization state into non-polarized state. Even if the polarization rotates in a single-mode fiber, the intensity of the interfering beams does not change. The output signal is not affected by the rotation of polarization.

Since a single-mode fiber is cheaper than a polarization maintaining fiber, this embodiment can be produced at a lower cost than embodiment 11 of FIG. 15. The embodiments of FIG. 5, FIG. 7, FIG. 8 and FIG. 9 employ fiber-type polarizers. The polarizer determines the polarization of beams to a definite direction. Coincidence of the polarization ensures the clockwise beam and the counterclockwise beam the interference with each other. However, fiber-type polarizers are difficult to fabricate. There are several kinds of polarizers accessible to a fiber-optic gyroscope. One is a fiber-type polarizer produced by winding a birefringent fiber around a bobbin. This is expensive because of the use of the birefringent fiber. Another one is produced by grinding a side of a bent fiber till the core revealed and gluing a metal plate on the revealed surface. The beams having polarization parallel with the metal surface attenuate by generating eddy current. The other beams having polarization perpendicular to the metal surface remain intact. Thus the device acts as a polarizer. The third version is similarly produced by grinding a side of a bent fiber till the core is revealed and gluing a birefringent material. The beams with some polarization exit from the boundary between the fiber core and the birefringent material. The other beams with another polarization are reflected at the boundary. The device plays the role of a polarizer. Therefore, any polarizers suitable for a fiber are difficult to make. This embodiment interposes a depolarizer instead of a polarizer. Displacement of a polarizer by a depolarizer facilitates the production of the embodiment.

A depolarizer can be made by joining two birefringent materials with the anisotropic axes inclining at 45 degrees. The ratio of lengths of two birefringent materials is in many cases settled to be 2:1. Other ratios are also available as long as the path difference between the two beams with perpendicular polarization planes is longer than the coherent length of the light and the path difference between two birefringent materials is longer than the coherent length of the light. A depolarizer is one consisting of two birefringent crystals joined together with the anisotropic axes twisting at 45 degrees. Another depolarizer is a fiber-type which is produced from two birefringent fibers by adjusting the optical principal axes twisting at 45 degrees and splicing two fibers. The optical path difference between the ordinary beams and the extraordinary beams in each birefringent fiber must be longer than the coherent length of the light.

Here the birefringence is denoted by $B$ ($=n_x-n_y$). $L_1$ and $L_2$ are lengths of the birefringent materials ($L_1<L_2$). C is a coherent length of the light source. Realization of depolarizer requires conditions $BL_1>C$, $BL_2>C$ and $B(L_2-L_1)>C$. If a depolarizer is produced with birefringent fibers having a large birefringence of about $5\times10^{-4}$ and a light source has a short coherent length of about 50 μm, about 1 m long fibers are sufficient to build a depolarizer. There exist light sources of such a short coherent length and birefringent fibers of such a high birefringent. However, they are still exceptional, expensive ones at present.

[EMBODIMENT 14]

It is preferable to use commonplace parts from the standpoint of lowering the production cost. Namely, alleviation of the cost demands the adoption of light sources of longer coherent lengths and birefringent fibers of less birefringence. For example, an ordinary laser diode has a coherent length of about 1 min. In this case, it takes several meters of birefringent fibers of the high birefringence to build a depolarizer for the ordinary laser diode. Furthermore, use of less birefringent fibers and an ordinary light source will require very long birefringent fibers of about several hundreds of meters. In the case it is preferable to assign the role of a depolarizer to the fiber coil itself. Thus, the fiber coil shall possess the functions of a depolarizer as well as a sensing coil. It may sound strange to construct a depolarize by a fiber coil. Two long polarization maintaining fibers of the length ratio of 2:1 are connected at the ends in the disposition where the anisotropic optical axes twist at 45 degrees. Then the connected fibers are wound many turns in a coil. The fiber coil is entirely made from birefringent fibers. But it is not fully equivalent to FIG. 15 in which the birefringent fiber (PM fiber) has no junction in the coil.

[EMBODIMENT 15]

Figure 2:
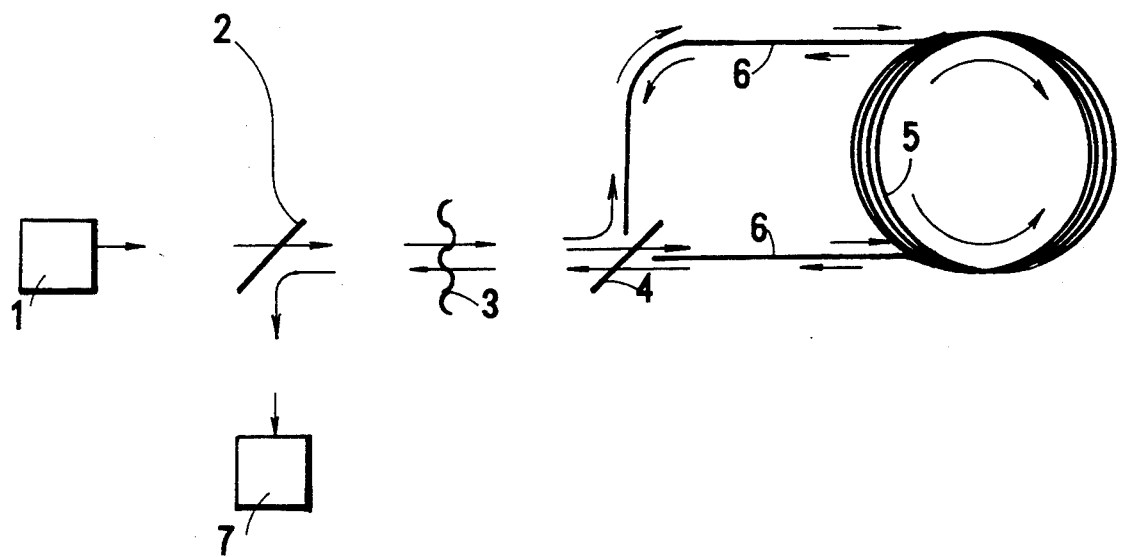
FIG. 2 is a schematic view of a conventional fiber-optic gyroscope equipped only with necessary components (minimum configuration)
Figure 3A:
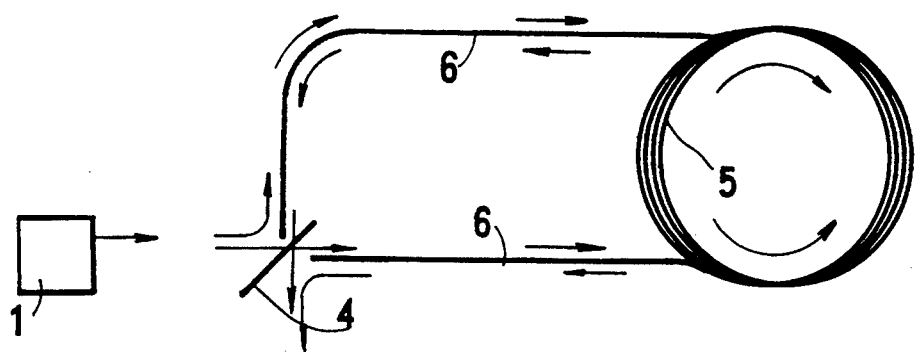
FIG. 3(a) is a schematic view of a prior fiber-optic gyroscope having one beam dividing-and-combining device alone.
Figures 3B, 3C:
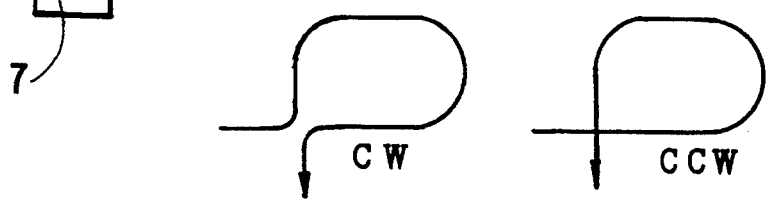
FIGS. 3(b) and 3(c) illustrate the beam traveling directions in device illustrated in FIG. 3(a)
Figure 4:
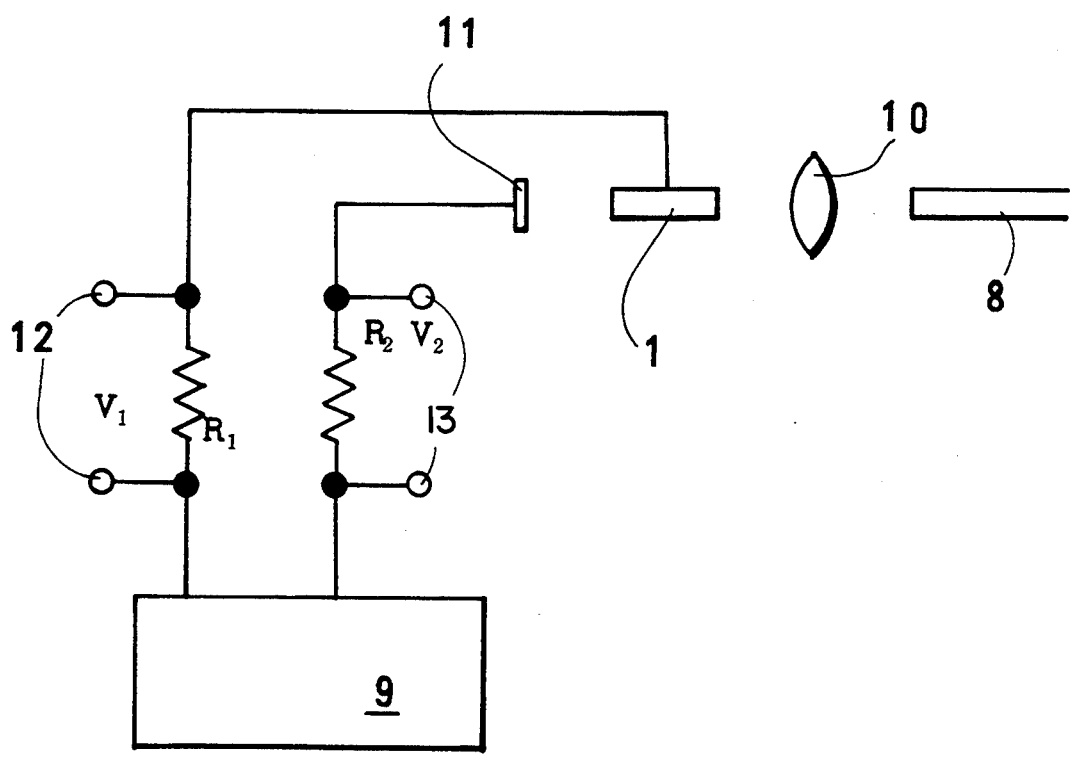
FIG. 4 is a simplified view of parts of a light source, a monitoring diode, and an APC circuit of this invention.
Figure 26:
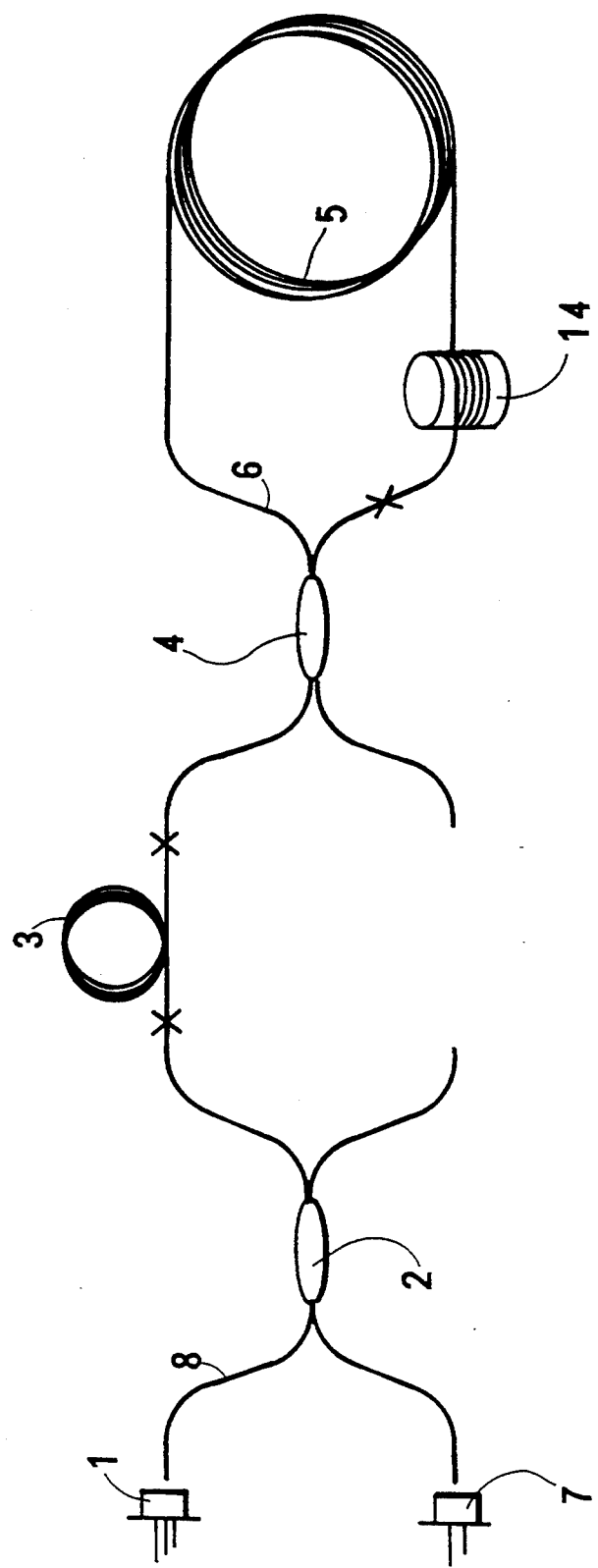
FIG. 26 is a view of a prior gyroscope in which the polarizer must interpose at an intermediate fiber path between the couplers.
Figure 27A:
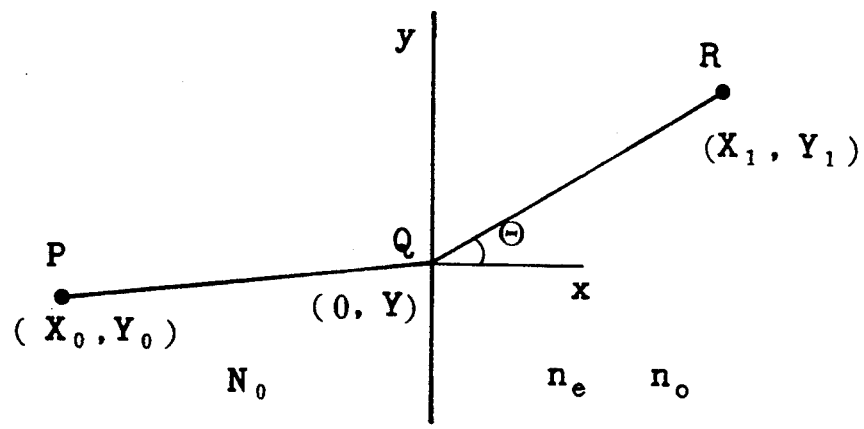
FIG. 27(a)–FIG. 27(b) are explanatory figures for calculating the optical path in a birefringent crystal on the basis of Fermat's principle, wherein FIG. 27(1) gives the definition of a coordinate, P is an initial point, R is a final point and Q is a surface boundary and FIG. 27(2) is a perspective view of a birefringent material showing the separation of ordinary beams and extraordinary beams and the coordinate for explanation.
Figure 27B:
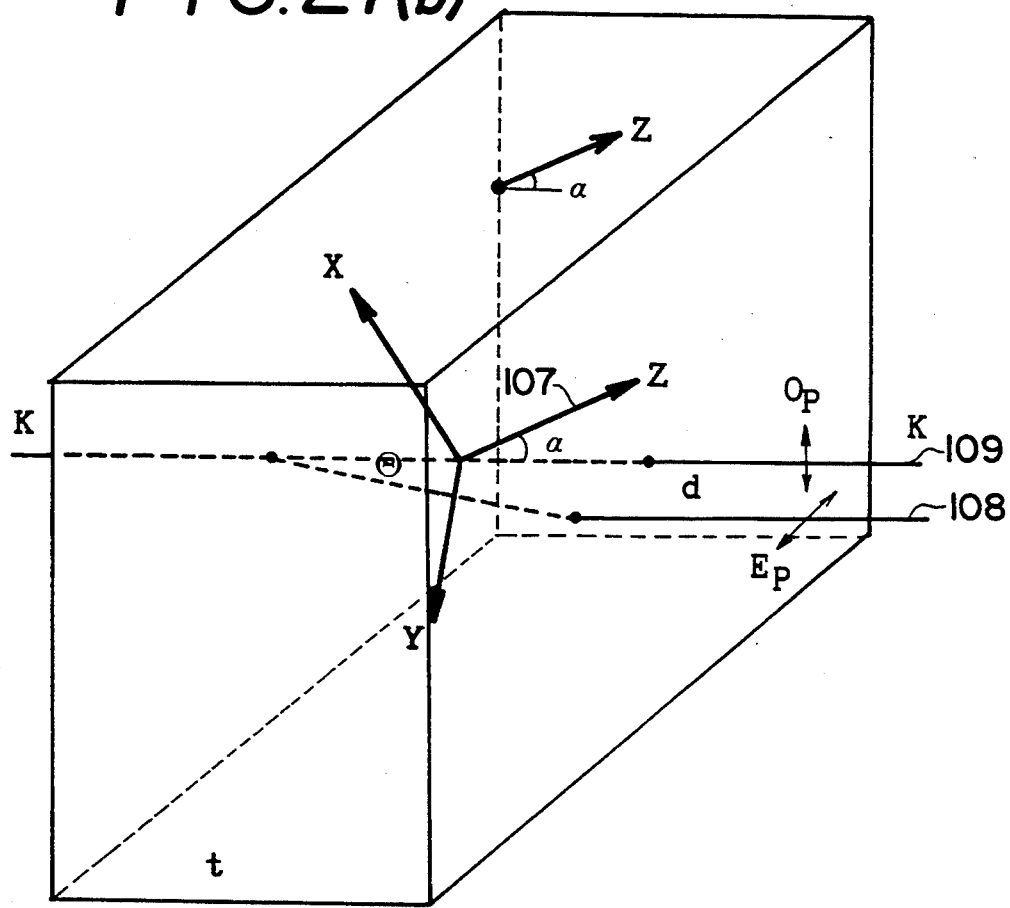
Figure 28:
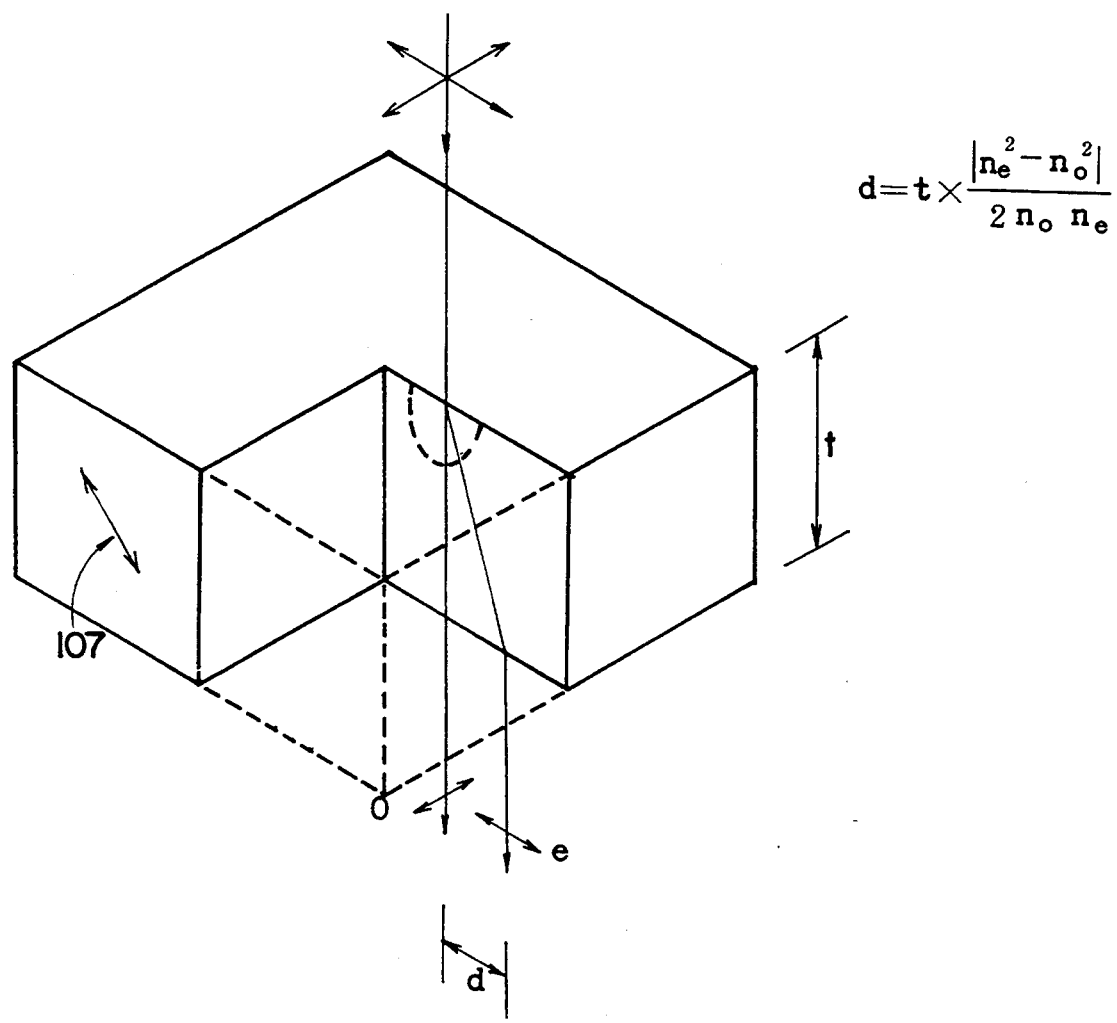
FIG. 28 is a perspective view clarifying the separation of ordinary beams and extraordinary beams in a birefringent material.
Figure 29:
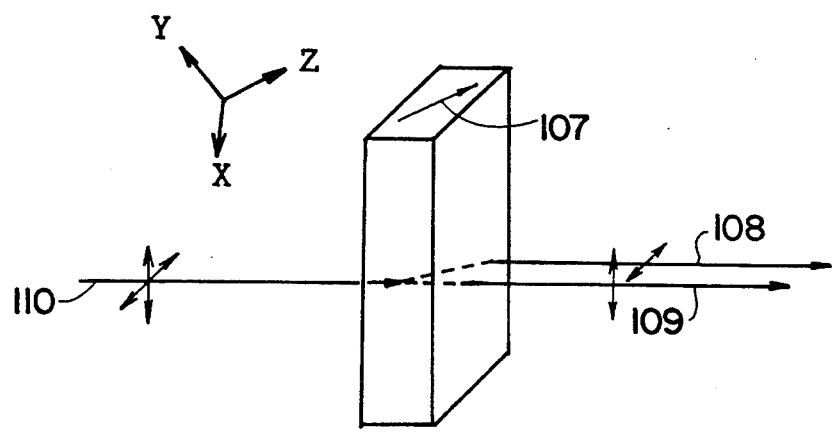
FIG. 29 is a figure of a polarization selection device which separates beams into ordinary beams and extraordinary beams spatially by the birefringence.
Figure 30:
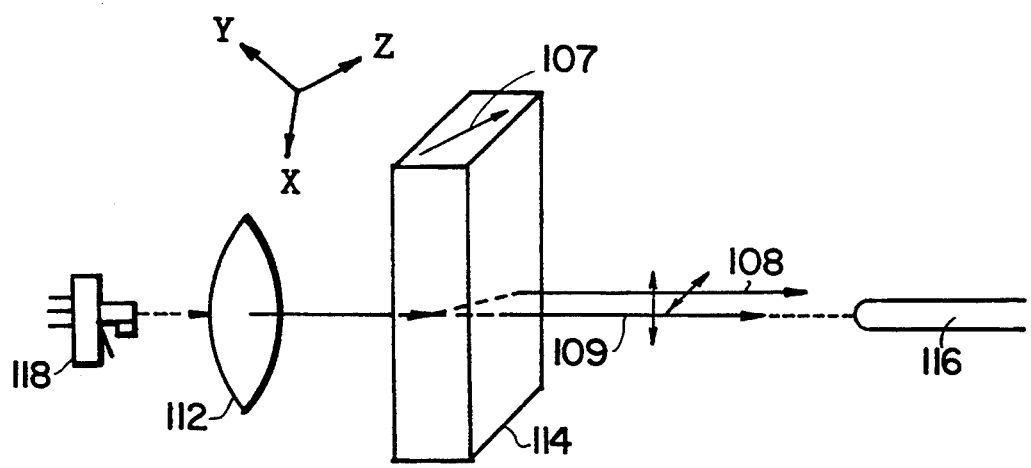
FIG. 30 is a figure of a light source module which supplies linearly-polarized beams into a fiber by separating beams emanating from a light emitting device into ordinary beams and extraordinary beams, leading only either of the beams to a core of the fiber.
Figure 31:
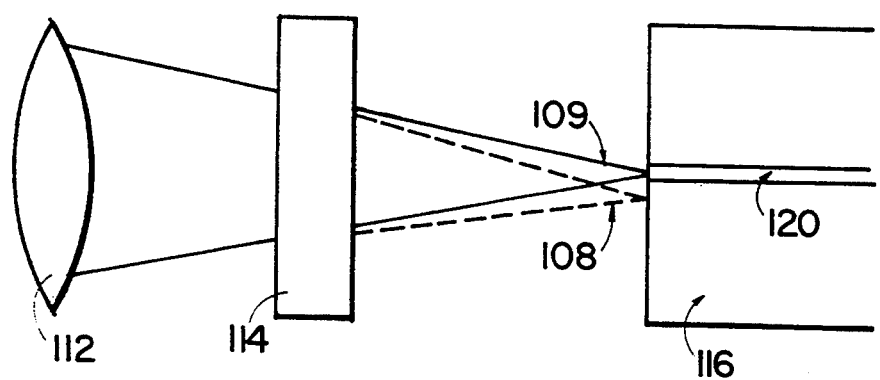
FIG. 31 is a figure showing the selection of polarization of light beams by converging beams by a lens, separating the beams into ordinary beams and extraordinary beams, receiving only ordinary beams by a core of a fiber.
Figure 32:
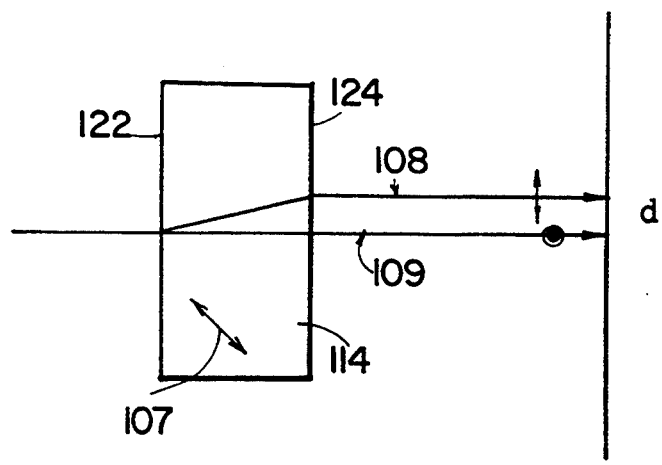
FIG. 32 is an explanatory figure of a birefringent device having an anisotropic principal axis slanting to the beams which divides the beams into extraordinary beams and ordinary beams spatially.
Figure 33:
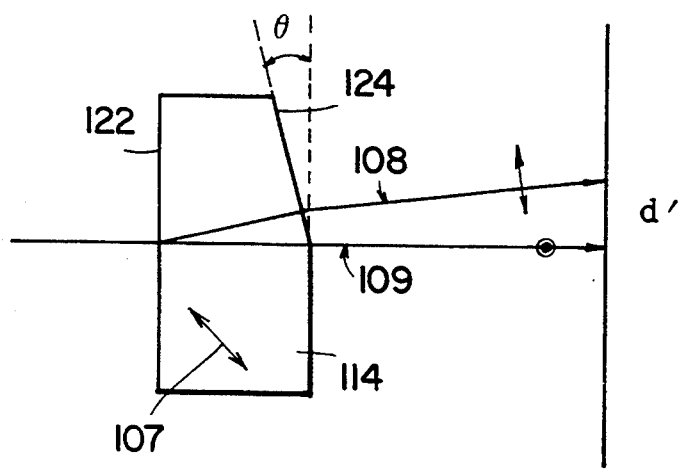
FIG. 33 is a figure of a birefringent device having a rear surface ground slantingly to the beams which divides the beams into halves and refracts one far outward.

Interposition of a polarizer will also enhance the performance in the gyroscope of this invention. A polarizer is installed in the fiber path in the examples of FIG. 5, FIG. 7, FIG. 8 and FIG. 9. Here for the sake of its simple structure, a polarizer shall be inserted between the light source and the fiber path. Prior gyroscopes (FIG. 2) have positioned a polarizer(3) in the intermediate fiber path between the first coupler (4) and the second coupler (2), because progressing beams and regressing beams must pass through the polarizer. FIG. 26 demonstrates a typical prior gyroscope in which a fiber-type polarizer (3) is intervened in the intermediate path between the fiber couplers (4) and (2).

Figure 17:
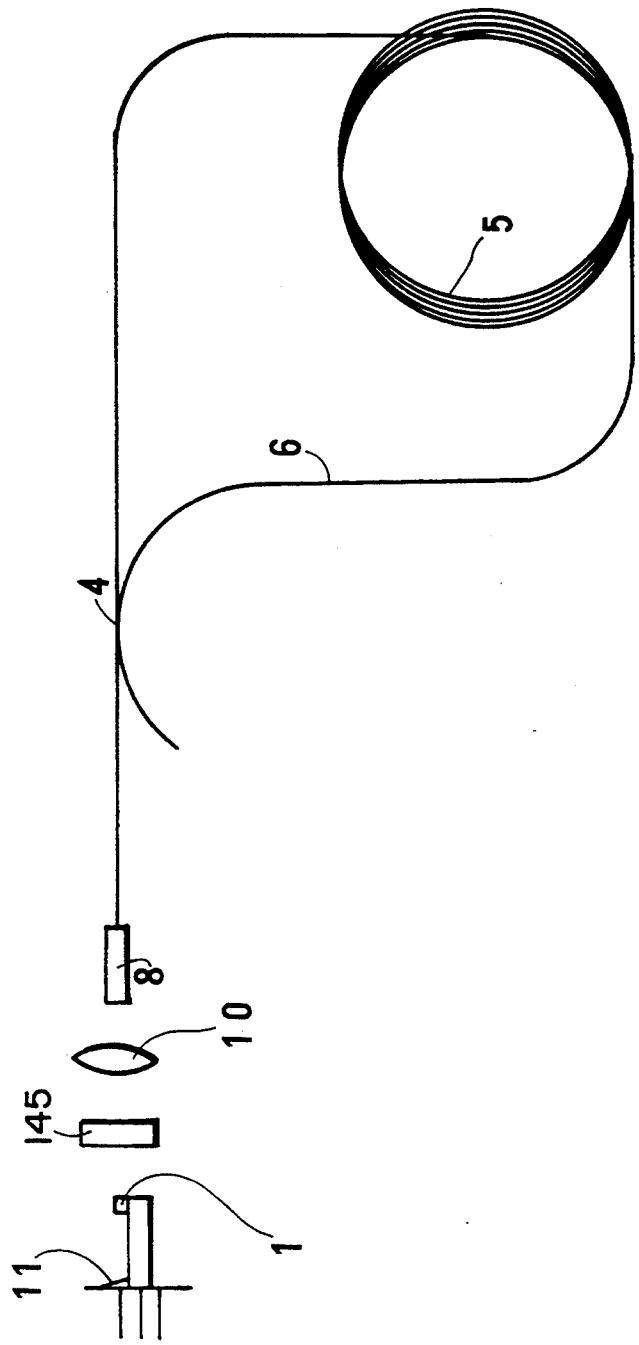
FIG. 17 is a schematic view of another embodiment provided with a polarizer or birefringent material interposed between the light source and the lens.

Fortunately, since the light source plays the role of a photodetector in this invention, the polarizer can be inserted between the light source and the beginning end of the fiber. Regressing beams as well as progressing beams pass through the polarizer just in front of the light source. The possibility of disposing a polarizer in a free space before the initial end of a fiber widens the range of selection of polarizers. The enhanced freedom of selection of polarizers enables the gyroscope to use less expensive polarizers. FIG. 17 shows an example in which a polarizer plate or birefringent material plate intervenes between a light source (1) and a fiber end. The light beams emanating from the light source (1) are converted by the polarizer to linearly-polarized beams. The beams are converged by a lens (10) to the beginning end of the fiber (8) and divided into halves by the beam dividing-and -integrating device (4). The divided beams spread in a fiber coil (5) clockwise and counterclockwise. The beams are integrated by the beam dividing-and-combining device (4). The integrated beams penetrate the lens (10) and the polarizer and return the light source (1). Since the polarizer arranges the polarization planes of the clockwise- and counterclockwise-spreading beams in the same direction, the returning beams can interact with the light source with high efficiency.

[EMBODIMENT 16]

A birefringent material plate is interposed between the light source (1) and the fiber (8) in stead of the polarizer. The birefringent material gives ordinary beams and extraordinary beams different refractive indexes and different optical paths. Thus the birefringent material can exclude either the ordinary beams or the extraordinary beams from the optical path. The other beams propagate in the path alone.

[EMBODIMENT 17]

Figure 18:
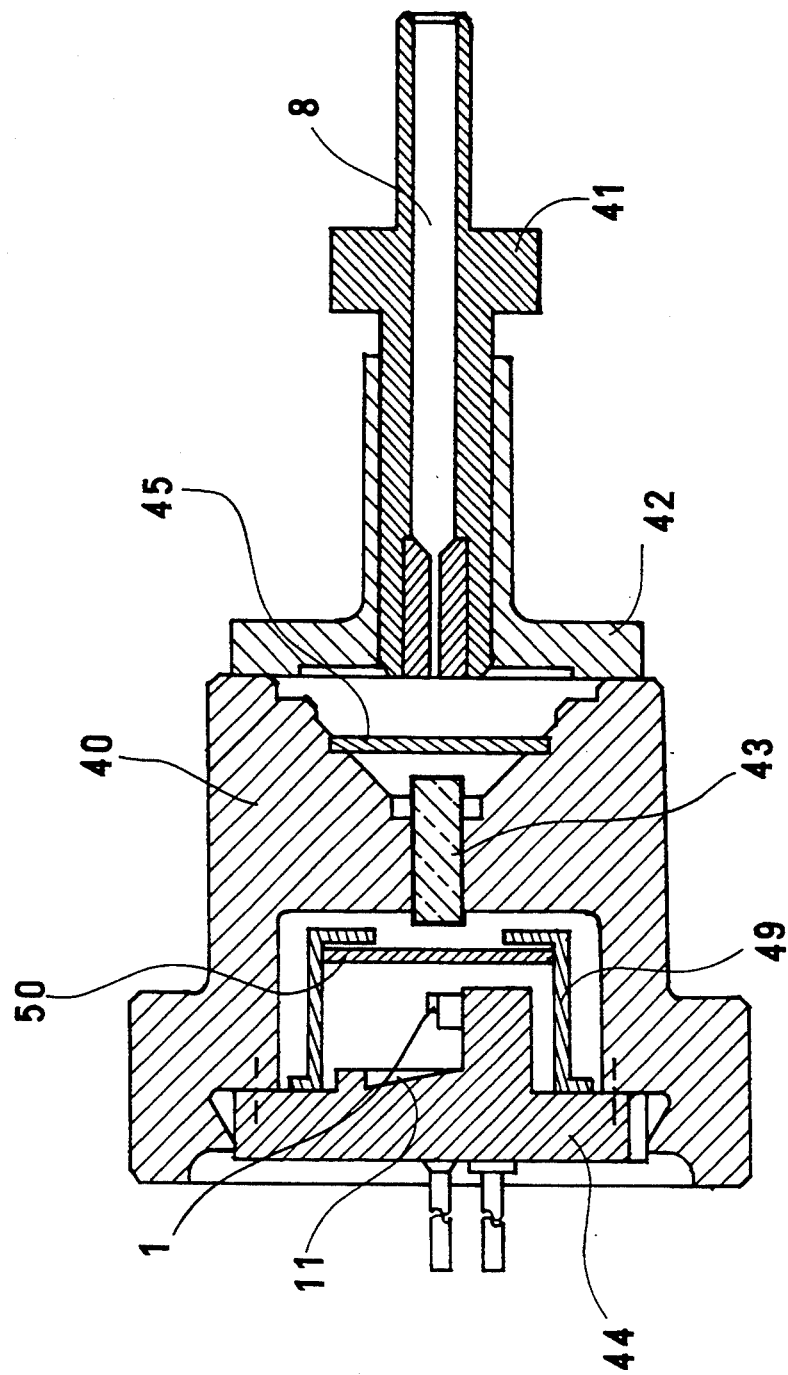

FIG. 18 is an enlarged section of a holder (40) for sustaining a fiber end. A light source chip (1) and a monitoring photodiode (11) are installed on a mount (44). The mount (44) is fixed in a lens holder (40). A ferrule (41) is affixed at the beginning end of an optical fiber (8). The ferrule (41) pierces a cavity of a flange (42). A lens (43) lying in a hole of the lens holder (40) converges the beams emanating from the light source chip on an end of the fiber (8). A polarizer (45) is interposed between the lens (43) and the fiber ends for arranging the polarization planes of the progressing beams and regressing beams.

[EMBODIMENT 18]

A birefringent material (46) replaces the polarizer (45) of embodiment 17 of FIG. 18.

[EMBODIMENT 19]

Figure 19:
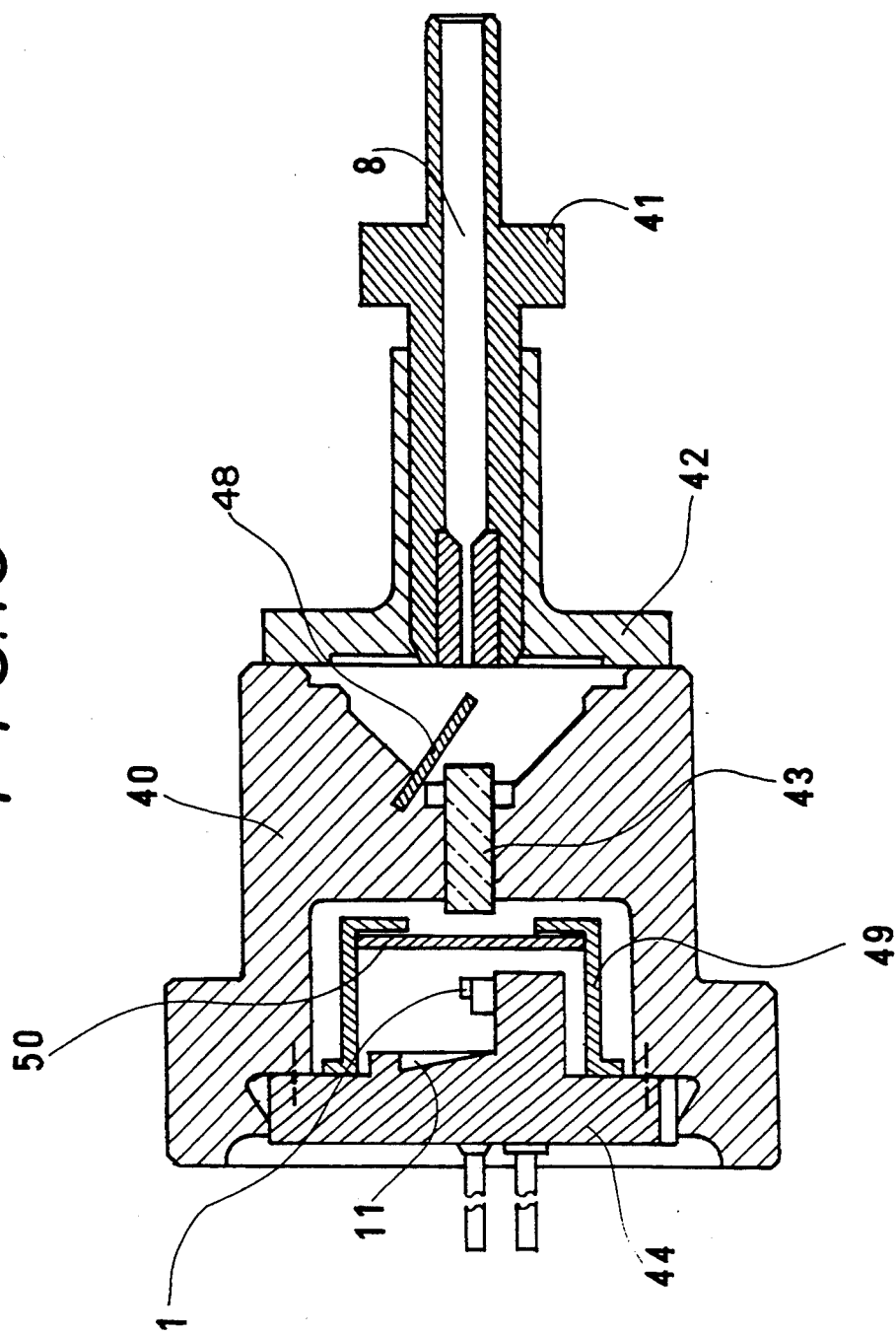

FIG. 19 shows another example of a holder. A polarizer plate (47) is interposed slantingly between the lens (43) and the fiber end. The cantilever fixation simplifies the structure of the lens holder.

[EMBODIMENT 20]

A birefringent material plate (48) is obliquely interposed between the light source and the fiber end instead of the polarization plate. The birefringent plate (48) excludes either ordinary beams or extraordinary beams from the optical path.

[EMBODIMENT 21]

Figure 20:
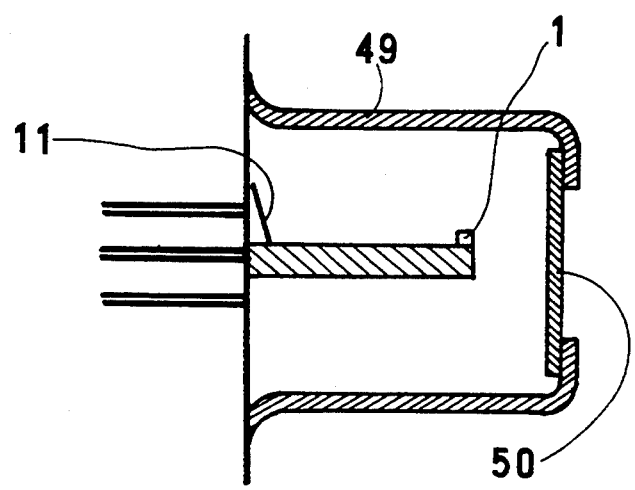
FIG. 20 is a sectional view of a light emitting device having a polarizer or birefringent material at a window of a cap.

FIG. 20 is a sectional view of a cap of a light source of another embodiment. A light source chip (1) and a monitoring diode chip (11) are installed on a mount. A cap (49) encloses the light source chip (1) and monitoring photodiode chip (11). Conventionally, a glass window seals an opening of the top cap (49). But a polarizer window (50) or a birefringent window seals the cap (49) in this embodiment. The polarizer or birefringent material has the function of selecting beams of a polarization plane as well as the function of sealing the package.

[EMBODIMENT 22]

Figure 21:
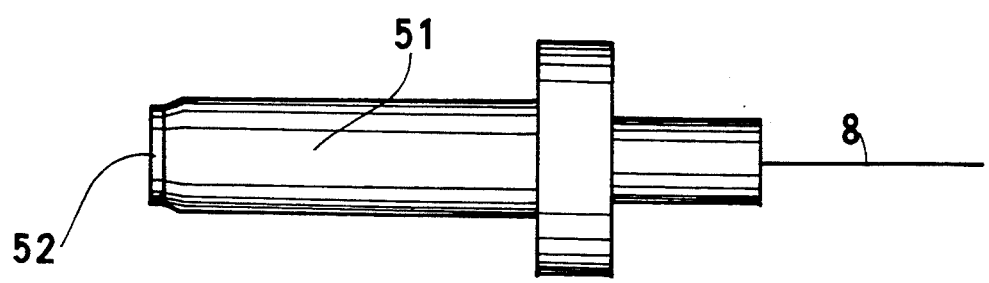
FIG. 21 is a side view of a ferrule having a polarizer or birefringent material at the front end.

FIG. 21 is a front view of a ferrule of another embodiment. A metal or plastic ferrule is fixed at a front end of a fiber (8). A polarizer chip or birefringent chip (52) is fitted at the front of a ferrule (51). The ferrule (51) will be inserted into a flange of a lens holder, as shown in FIG. 18 or FIG. 19. This version is easily practiced by a trivial amendment of a ferrule.

[EMBODIMENT 23]

Figure 25:
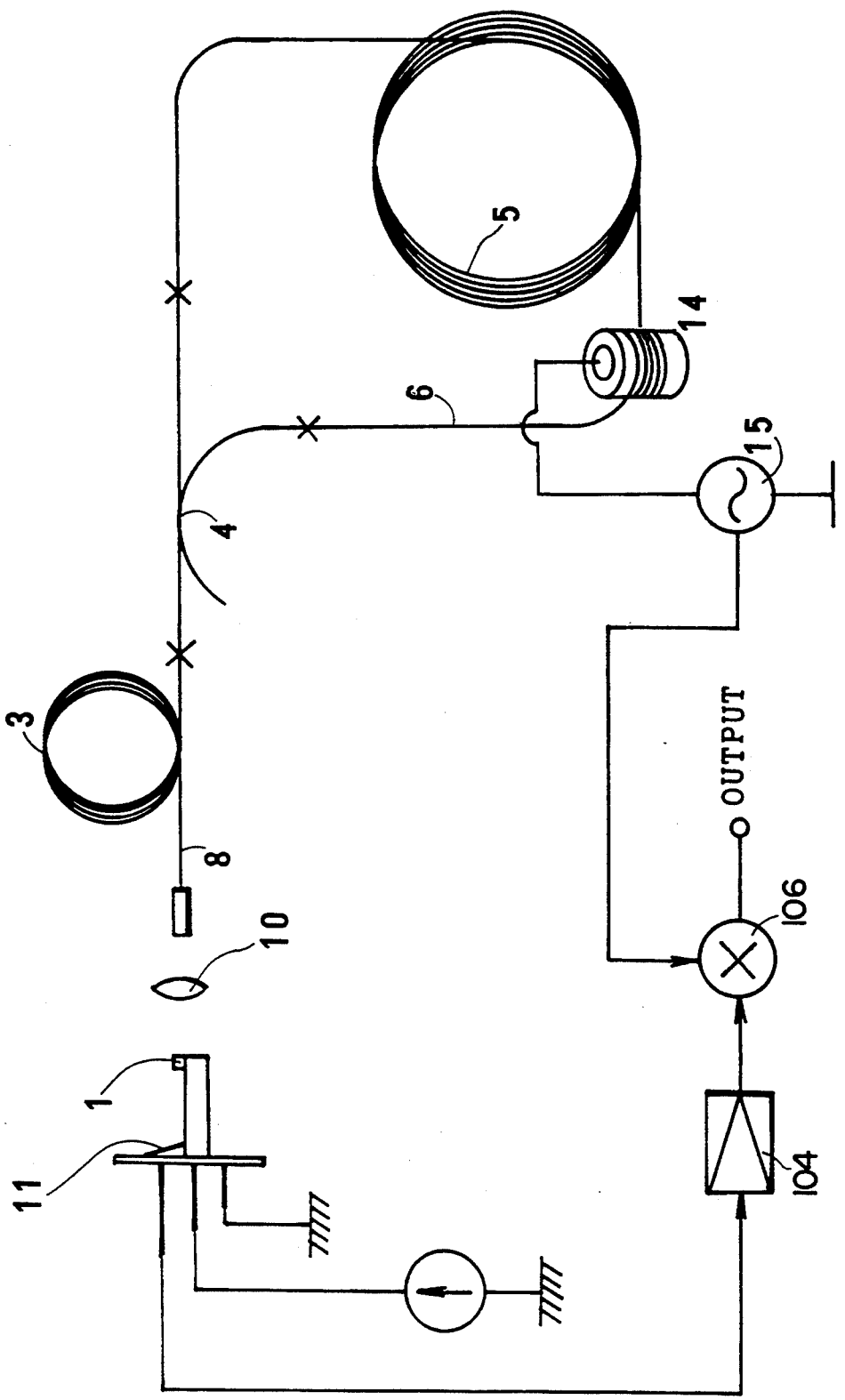
FIG. 25 is a schematic view of an embodiment employing the phase-modulation for the spreading beams.

FIG. 25 demonstrates a fundamental structure of the gyroscope of phase-modulation type of this invention as well as FIG. 5 or FIG. 12. A light source is driven by a constant current. The photocurrent of the monitoring photodiode is amplified and by amplifier 104 demodulated synchronously by synchronous oscillator circuit 106 the carrier signal from the phase-modulator. The examples described so far drive the light source at a constant DC current. Since the change of the emission state depending on the returning beams is an object of observation, the source should be driven by the constant DC current. The light source interacts with the returning beams. The signal is obtained by measuring the photocurrent of the monitoring diode under the condition of keeping either the driving current or the driving voltage constant. Otherwise, the signal can be obtained from the change of the driving current under the condition of keeping the photocurrent of the monitoring diode constant.

However, since the embodiments curtail one photodiode and the monitoring diode is used for sensing the intensity of the returning beams, the embodiments cannot maintain the light power at a constant level. Originally the monitoring photodiode (11) has been installed for monitoring the power of the light source and maintaining the power at a constant value. This invention diverts the monitoring photodiode into the device for measuring the intensity of interfering beams. The photodiode can no longer monitor the power of the light source.

However, a little improvement enables the monitoring photodiode (11) both to monitor the light power of the light source and to detect the phase difference $\Delta\Theta$. As shown in FIG. 22, direct back beams $P_o$ (broken line) just generated in the light source (1) enter the monitoring diode (11). The returning beams Pc (solid line) from the fiber coil penetrate the source (1) and enter the monitoring diode (11). The photodiode (11) senses the sum of Pc and $P_o$. In this case, the light source (1) shall preferably be modulated by the frequency $f_o$. FIG. 23(a) demonstrates the wave form of the modulation signal for the light source. Of course, the light source is a diode. The current flows at the diode only in the forward direction. In the half cycle of negative bias, no current flows and no light emanates. The light source emits light only in the other half cycle of positive bias.

Superposition of modulation AC current upon the constant DC current displaces the wave form of FIG. 23 (a) upward by the DC current bias. The wave form of the direct back beams $P_o$ is denoted by FIG. 23(b). The direct back beams reveal no time delay regarding the modulation wave of FIG. 23(a). However, the returning beams Pc from the fiber coil delays by $\tau$ from the modulation signal as shown in FIG. 23 (c). The delay time $\tau = nL/c$ can discern the returning beams Pc from the direct back beams $P_o$, where n is the refractive index of the fiber, L is the length of the fiber of coil and c is the light velocity. The power of the light source can be obtained by detecting synchronously the output of the monitoring diode by the carrier denoted by FIG. 23(a) which has the same phase as the driving bias has. Thus, two different signals can be deduced from the output of the monitoring diode.

Figure 24:
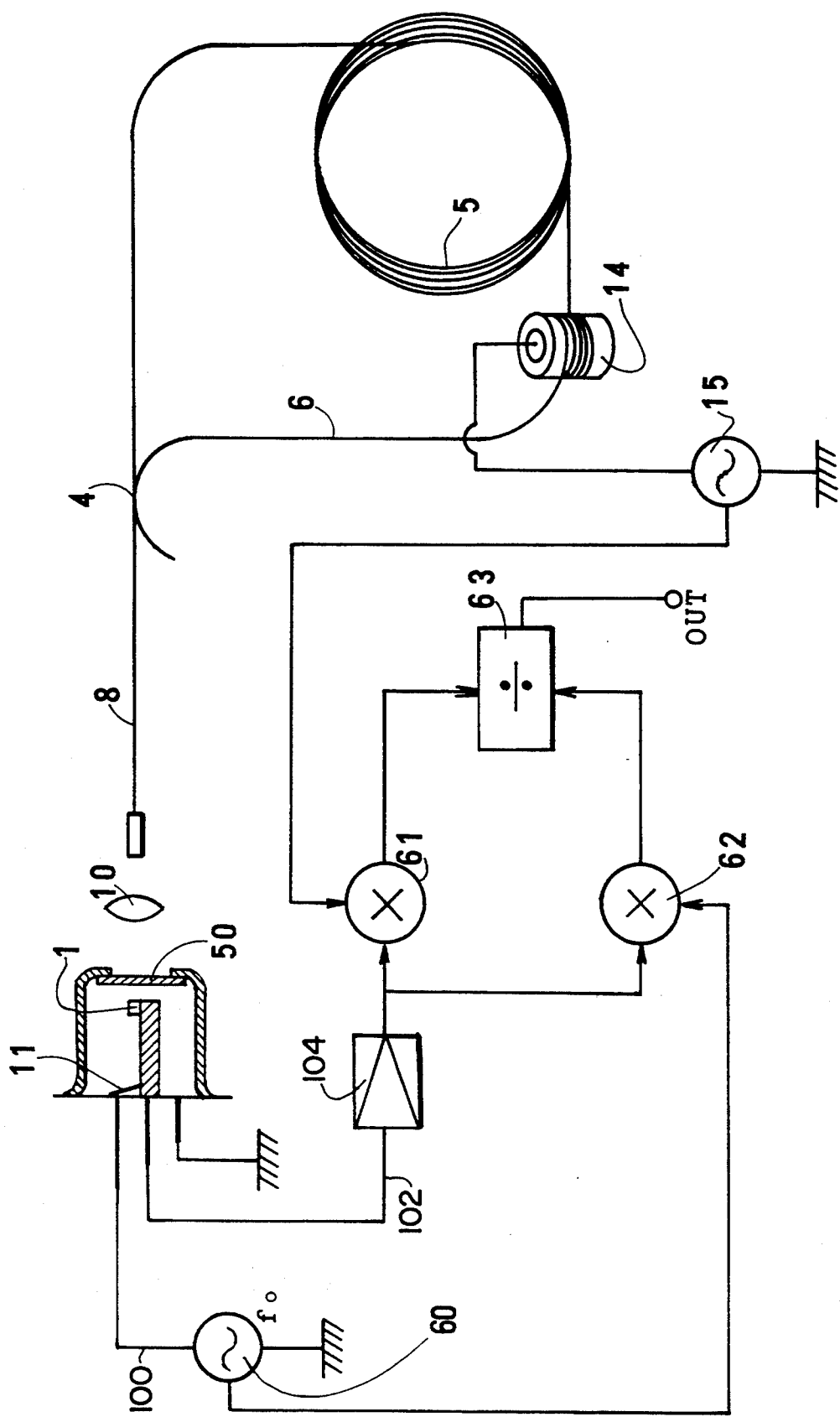
FIG. 24 is a schematic view of another embodiment with an improvement for eliminating the fluctuation of light power by modulating the beams by phase, driving the light source by an AD current, and demodulating the output of the monitoring diode in synchronousness with the driving of the light source.

FIG. 24 shows an embodiment having such a device for monitoring the light power. A sine wave oscillator (60) drives a light source (1) with AC voltage 100 of frequency $f_o$ (or with DC+AC ). A fiber path at the end of the fiber coil is provided with a phase-modulator (14). Another sine wave oscillator (15) drives the phase-modulator (14) with AC voltage of frequency $f_m$. The signal is deduced from the photocurrent 102 of a monitoring diode (11). The photocurrent is amplified by an amplifier (104).

A first synchronous detecting circuit (PSD1)(61) demodulates the amplified signal with the first carrier of frequency $f_m$ of the phase-modulation. This demodulation has been always done in the phase-modulation gyroscopes. This demodulation gives the fundamental component of the signal. Another demodulation by a carrier of frequency $nf_m$ (n:integer) offers the n-th harmonics of the signal. The fundamental component and harmonic components include the phase difference $\Delta\Theta$ between the clockwise-beam and counterclockwise-beam.

A second synchronous detecting circuit (PSD2)(62) demodulates the amplified photocurrent by a carrier of the frequency $f_o$ and the phase same as the driving signal of the light source. The result brings about the intensity of the light power immune from the influence of the returning beams. A divider (63) divides the output of the first detecting circuit (PSD1) by the output of the second detecting circuit (PSD2). The quotient is a signal free from the fluctuation of the light power.

[EMBODIMENT 24]

Embodiment 23 has employed the direct modulation of the light source. Otherwise indirect modulation of the light intensity is also available. A modulator is installed midway in the optical path. Light beams are modulated by the modulator with the frequency $f_o$. Like the former embodiment, the output of the monitoring diode is demodulated by a carrier of frequency $f_o$ and a carrier of frequency $f_m$. In this case, the returning beams are also modulated with the frequency $f_o$ in amplitude. The frequency $f_o$ is far smaller than $f_m$. For example, the power of the light source can be obtained by demodulating the photocurrent by the frequency $f_m$ and taking average of the demodulated signal in the time length of $2\pi/f_o$.

[EMBODIMENT 25]

Figure 34:
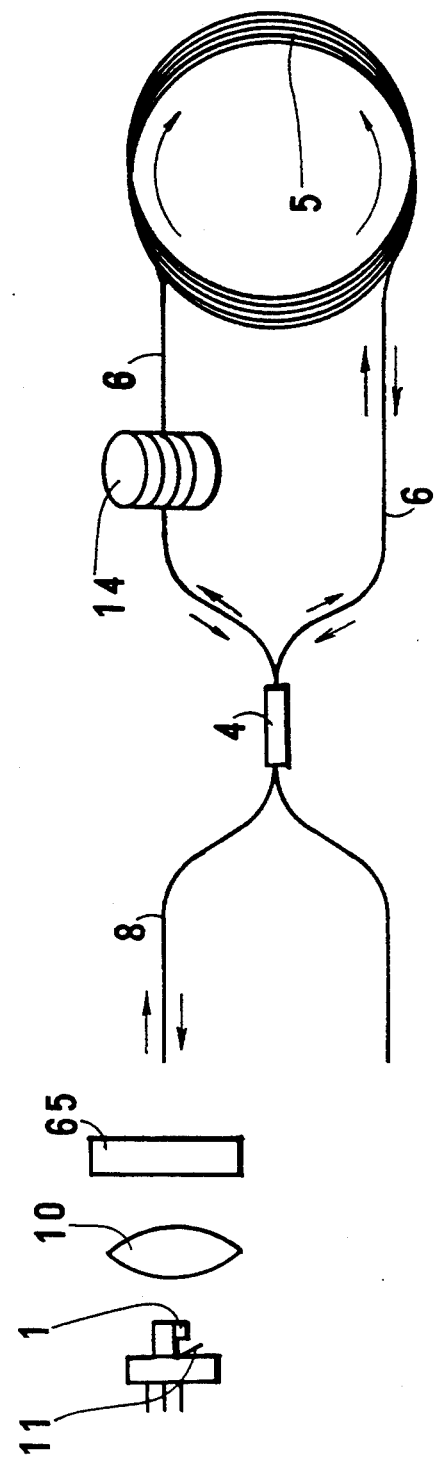
FIG. 34 is a schematic view of a fiber optic-gyroscope of this invention having a birefringent material in front of a light source for guiding linearly-polarized beams to the core of an fiber.
Figure 37:
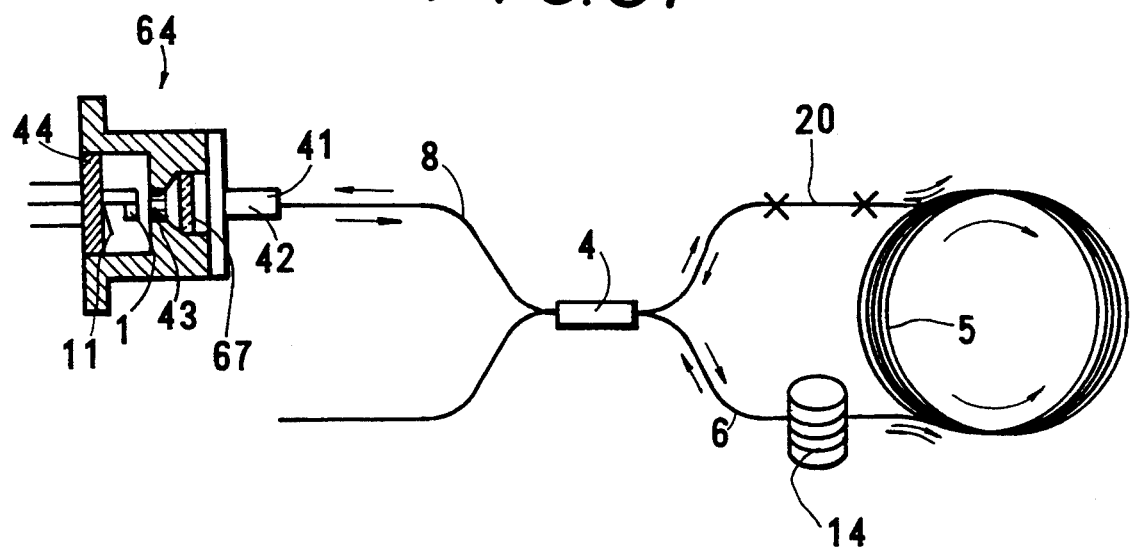
FIG. 37 is a schematic view of a fiber-optic gyroscope of an embodiment having a light source module with birefringent material.

It has been explained that the birefringent material (65) interposed between the light source and the fiber (8) is an equivalent of a polarizer, as shown in FIG. 34. FIG. 37 is an embodiment utilizing the selection of polarization by a birefringent material. A light source and a birefringent material are unified into a light source module (64). The light source module (64) is connected to an end of a fiber (8). The beams spreading in the fiber (8) are divided in half at a fiber coupler (4). The beams propagate in the fiber coil clockwise and counterclockwise. A phase-modulator (14) modulates phases both of clockwise-spreading beam and of counterclockwise-spreading beam. What is important in this embodiment is the selection of polarization by a birefringent material. FIG. 36 exhibits the light source module (64) in detail. The light emitting device is a superluminescent diode (1) fixed on a protrusion of a mount in a lens holder (40). A monitoring photodiode (11) is provided at the back of the superluminescent diode chip (1). A refractive-index-distribution-type lens (43) and a birefringent crystal (67) are aligned in front of the light source (1). The birefringent crystal spatially separates an ordinary beam and an extraordinary beam due to the difference of the refractive index for two beams. A flange (42) covers a front opening of the lens holder (40). A ferrule (41) of a fiber (8) is inserted into a hole of the flange (42). The 2-dimensional position of the flange (42) on the surface vertical to the optical axis has been adjusted so as to select any one of the ordinary beam or the extraordinary beam to converge on the beginning end of the fiber (8). The beams emanating from the light source are converted into linearly-polarized beams by the birefringent crystal (67), e.g. quartz crystal. The birefringent crystal acts as a polarizer.

[EMBODIMENT 26]

Figure 38:
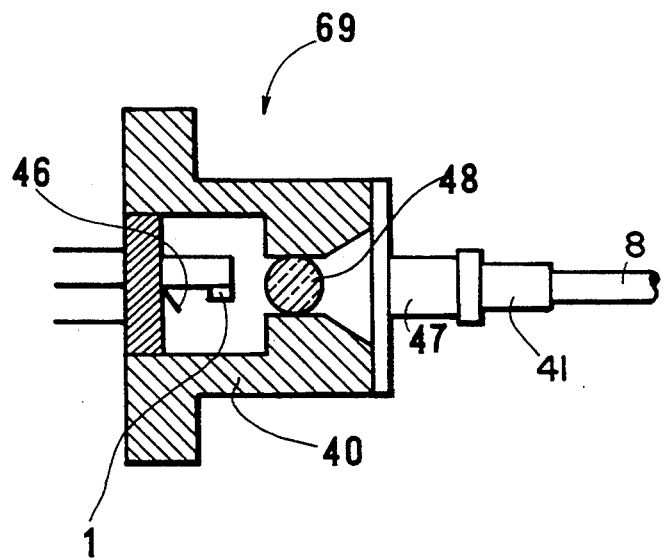
FIG. 38 is a sectional view of a light source module having a ball lens made from birefringent material.

Another light source module (69) is given by FIG. 38. A birefringent device and a lens are integrated into one. A ball lens (48) is made from birefringent material, e.g. quartz. The birefringent lens selects the polarization of beams as well as converges beams on the fiber core.

[EMBODIMENT 27]

FIG. 35 shows a polarization selection device utilizing a birefringent crystal. Ferrules (71) and (71') are fitted at ends of fibers (8) and (8'). Receptacles (70) and (70') are glued on both surfaces of a birefringent crystal (66) which divides ordinary beams and extraordinary beams in the direction of the anisotropic axis. The 2-dimensional position of the receptacles on the surfaces has been adjusted in order to lead only an ordinary beam or extraordinary beam to the fiber end. This polarization selection device is interposed in a fiber path of a fiber-optic gyroscope in order to polarize the beams. The fiber-type polarizers in FIG. 5, FIG. 7 and FIG. 8 can be replaced by the polarization selection device. The replacement reduces the parts cost of gyroscopes.

What we claim is:

1. A fiber-optic gyroscope obtaining signals from a light source for measuring an angular velocity from a phase difference between clockwise-spreading beams and counterclockwise-spreading beams in a fiber coil, the fiber-optic gyroscope comprising:
    a light source for emitting monochromatic or quasi-monochromatic light beams;
    a monitoring photodiode for monitoring a light power emitted from the light source;
    a beam dividing-and-combining device for dividing the beams from the light source and for integrating the beams returning to the light source; and
    a fiber coil for propagating beams from the beam dividing-and-combining device clockwise and counterclockwise,
    wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source.

2. A fiber-optic gyroscope obtaining signals from a light source for measuring an angular velocity from a phase difference between clockwise-spreading beams and counterclockwise-spreading beams in a fiber coil, the fiber-optic gyroscope comprising:
    a light source for emitting monochromatic or quasi-monochromatic light beams;
    a monitoring photodiode for monitoring a light power emitted from the light source;
    a beam dividing-and-combining device for dividing the beams from the light source and for integrating the beams returning to the light source; and
    a fiber coil for propagating beams from the beam dividing-and-combining device clockwise and counterclockwise,
    wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source, and wherein the light source is controlled to maintain light power at a constant value by an automatic power controller and the monitoring photodiode, and the change of the emission performance has an influence on a driving current of the light source, and the angular velocity is obtained based on a change of the driving current of the light source.

3. A fiber-optic gyroscope obtaining signals from a light source for measuring an angular velocity from a phase difference between clockwise-spreading beams and counterclockwise-spreading beams in a fiber coil, the fiber-optic gyroscope comprising:
    a light source for emitting monochromatic or quasi-monochromatic light beams;
    a monitoring photodiode for monitoring a light power emitted from the light source;
    a beam dividing-and-combining device for dividing the beams from the light source and for integrating the beams returning to the light source; and
    a fiber coil for propagating beams from the beam dividing-and-combining device clockwise and counterclockwise,
    wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source, and wherein the light source is controlled to maintain the light power at a constant value by an automatic power controller and the monitoring photodiode, and the change of the emission performance has an influence on an applied voltage to the light source, and the angular velocity is obtained based on a change of the applied voltage to the light source.

4. A fiber-optic gyroscope obtaining signals from a light source for measuring an angular velocity from a phase difference between clockwise-spreading beams and counterclockwise-spreading beams in a fiber coil, the fiber-optic gyroscope comprising:
    a light source for emitting monochromatic or quasi-monochromatic light beams;
    a monitoring photodiode for monitoring a light power emitted from the light source;
    a beam dividing-and-combining device for dividing the beams from the light source and for integrating the beams returning to the light source; and
    a fiber coil for propagating beams from the beam dividing-and-combining device clockwise and counterclockwise,
    wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source, and wherein the light source is driven with a constant current, the change of the emission performance has an influence on an applied voltage to the light source, and the angular velocity is obtained based on a change of the applied voltage to the light source.

5. A fiber-optic gyroscope as claimed in claim 1, wherein the light source is driven with a constant current, the change of the emission performance has an influence on a photocurrent of the monitoring diode, and the angular velocity is obtained based on a change of the photocurrent of the monitoring diode.

6. A fiber-optic gyroscope obtaining signals from a light source for measuring an angular velocity from a phase difference between clockwise-spreading beams and counterclockwise-spreading beams in a fiber coil, the fiber-optic gyroscope comprising:

a light source for emitting monochromatic or quasi-monochromatic light beams;

a monitoring photodiode for monitoring a light power emitted from the light source;

a beam dividing-and-combining device for dividing the beams from the light source and for integrating the beams returning to the light source; and a fiber coil for propagating beams from the beam dividing-and-combining device clockwise and counterclockwise, wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source, and wherein the light source is driven at a constant voltage, the change of the emission performance has an influence on a driving current of the light source, and the angular velocity is obtained based on a change of the driving current.

7. A fiber-optic gyroscope as claimed in claim 1, wherein the light source is driven at a constant voltage, the change of the emission performance has an influence on a photocurrent of the monitoring diode, and the angular velocity is obtained based on a change of the photocurrent.

8. A fiber-optic gyroscope as claimed in claim 1, further comprising a phase-modulator interposed at an end of the fiber coil, and wherein the returning light beams also enter the monitoring diode, a photocurrent of the monitoring diode is synchronously detected by a carrier of the modulation frequency, and the angular velocity is obtained based on a synchronously-detected signal.

9. A fiber-optic gyroscope as claimed in claim 1, further comprising a phase-modulator is interposed at an end of the fiber coil, and wherein the returning light beams enter the monitoring diode, a photocurrent of the monitoring diode is synchronously detected by a carrier of the modulation frequency, a second carrier having a frequency twice the modulation frequency, and a third carrier having a frequency four times the modulation frequency in order to obtain a fundamental signal, a second harmonic and a fourth harmonic, the phase modulator is controlled so as to let the second harmonic vanish, and the angular velocity is obtained based on a quotient of the fundamental signal divided by the fourth harmonic.

10. A fiber-optic gyroscope obtaining signals from a light source for measuring an angular velocity from a phase difference between clockwise-spreading beams and counterclockwise-spreading beams in a fiber coil, the fiber-optic gyroscope comprising:

a light source for emitting monochromatic or quasi-monochromatic light beams;

a monitoring photodiode for monitoring a light power emitted from the light source;

a beam dividing-and-combining device for dividing the beams from the light source and for integrating the beams returning to the light source;

a fiber coil for propagating beams from the beam dividing-and-combining device clockwise and counterclockwise; and a phase-modulator interposed at an end of the fiber coil, wherein the light source is controlled by an automatic power controller in order to maintain the light power to be a constant value, and wherein the beam dividing-and-combining device directs the beams returning from the fiber coil to the light source so that the light source is perturbed by the returning beams causing emission performance of the light source to be changed by the returning beams, the change of emission performance has an influence on a driving current, the driving current is synchronously detected by a carrier of the modulation frequency, and the angular velocity is obtained based on a synchronously-detected signal.

11. A fiber-optic gyroscope as claimed in claim 1, wherein a phase-modulator is interposed at an end of the fiber coil, the light source is controlled by an automatic power controller in order to maintain the light power at a constant value, the change of emission performance has an influence on a driving current, the driving current is synchronously detected by a carrier of the modulation frequency, a second carrier having a frequency twice that of the modulation frequency, and a third carrier having a frequency four times that of the modulation frequency in order to obtain a fundamental signal, a second harmonic and a fourth harmonic, the phase modulator is controlled so as to let the second harmonic vanish, and the angular velocity is obtained by a quotient of the fundamental signal divided by the fourth harmonic.

12. A fiber-optic gyroscope obtaining signals from a light source for measuring an angular velocity from a phase difference between clockwise-spreading beams and counterclockwise-spreading beams in a fiber coil, the fiber-optic gyroscope comprising:

a light source for emitting monochromatic or quasi-monochromatic light beams, wherein the light source is a laser diode producing light beams by induced emission accompanied by a plurality of longitudinal modes;

a monitoring photodiode for monitoring a light power emitted from the light source;

a beam dividing-and-combining device for dividing the beams from the light source and for integrating the beams returning to the light source; and a fiber coil for propagating beams from the beam dividing-and-combining device clockwise and counterclockwise, wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source.

13. A fiber-optic gyroscope obtaining signals from a light source for measuring an angular velocity from a phase difference between clockwise-spreading beams and counterclockwise-spreading beams in a fiber coil, the fiber-optic gyroscope comprising:

a light source for emitting monochromatic or quasi-monochromatic light beams, wherein the light source is a superluminescent diode producing light beams by induced emission accompanied by a plurality of longitudinal modes;

a monitoring photodiode for monitoring a light power emitted from the light source;

a beam dividing-and-combining device for dividing the beams from the light source and for integrating the beams returning to the light source; and a fiber coil for propagating beams from the beam dividing-and-combining device clockwise and counterclockwise, wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source.

14. A fiber-optic gyroscope as claimed in claim 1, wherein the fibers are made from polarization maintaining fibers and all other paths except the fiber are made from parts which have a function of maintaining polarization of beams which propagate in the parts.

15. A fiber-optic gyroscope as claimed in claim 1, wherein the fiber coil is made from a single-mode fiber and at least one depolarizer is interposed in a light path.

16. A fiber-optic gyroscope as claimed in claim 15, wherein a polarizer is disposed between the light source and the beam dividing-and-combining device.

17. A fiber-optic gyroscope as claimed in claim 1, wherein the fiber coil constructs a depolarizer as a whole.

18. A fiber-optic gyroscope obtaining signals from a light source for measuring an angular velocity from a phase difference between clockwise-spreading beams and counterclockwise-spreading beams in a fiber coil, the fiber-optic gyroscope comprising:

a light source for emitting monochromatic or quasi-monochromatic light beams, wherein the light source is modulated at a frequency greater than a frequency of the phase-modulation;

a monitoring photodiode for monitoring a light power emitted from the light source, wherein beams emitted from the light source that are reflected directly back to the light source are discriminated from the returning beams in an output of the monitoring photodiode by a difference of phase;

a beam dividing-and-combining device for dividing the beams from the light source and for integrating the beams returning to the light source;

a fiber coil for propagating beams from the beam dividing-and-combining device clockwise and counterclockwise: and a phase-modulator is interposed at an end of the fiber coil, wherein the beam dividing-and-combining device directs the beams returning from the fiber coil to the light source so that the light source is perturbed by the returning beams causing emission performance of the light source to be changed by the returning beams so that an angular velocity is obtained based on the change of emission performance of the light source, and the returning light beams also enter the monitoring diode, a photocurrent of the monitoring diode is synchronously detected by a carrier of the modulation frequency, and the angular velocity is obtained based on a synchronously-detected signal.

19. A fiber-optic gyroscope obtaining signals from a light source for measuring an angular velocity from a phase difference between clockwise-spreading beams and counterclockwise-spreading beams in a fiber coil the fiber-optic gyroscope comprising:

a light source for emitting monochromatic or quasi-monochromatic light beams, a light source emission performance being perturbed by returning beams;

a monitoring photodiode for monitoring light power emitted from the light source;

a birefringent device aligned in front of the light source with an anisotropic optical axis not parallel with nor vertical to incident beams for separating ordinary beams and extraordinary beam;

an optical fiber with an end on which either ordinary beams or extraordinary beams converge;

a beam dividing-and-combining device for dividing the beams from the fiber and for integrating the beams returning to the light source; and a fiber coil for propagating beams from the beam dividing-and-combining device clockwise and counterclockwise, wherein the beam dividing-and-combining device directs the beams returning from the fiber coil to the optical fiber, the optical fiber sends the light beams to the birefringent device, the birefringent device provides one of ordinary beams and extraordinary beams to the light source and acts as a polarizer, the light source is perturbed by the returning beams, emission performance is changed by the returning beams, and an angular velocity is obtained based on a change of the emission performance of the light source.

20. A fiber-optic gyroscope as claimed in claim 19, wherein the light source is controlled to maintain the light power at a constant value by an automatic power controller and the monitoring photodiode, and wherein the change of the emission performance has an influence on a driving current of the light source and the angular velocity is obtained based on a change of the driving current of the light source.

21. A fiber-optic gyroscope as claimed in claim 19, wherein the light source is controlled to maintain the light power at a constant value by an automatic power controller and the monitoring photodiode, and wherein the change of the emission performance has an influence on an applied voltage to the light source and the angular velocity is obtained based on a change of the applied voltage to the light source.

22. A fiber-optic gyroscope as claimed in claim 19, wherein the light source is driven with a constant current, and wherein the change of the emission performance has an influence on an applied voltage on the light source and the angular velocity is obtained based on a change of the applied voltage to the light source.

23. A fiber-optic gyroscope as claimed in claim 19, wherein the light source is driven with a constant current, and wherein the change of the emission performance has an influence on a photocurrent of the monitoring diode and the angular velocity is obtained based on a change of the photocurrent of the monitoring diode.

24. A fiber-optic gyroscope as claimed in claim 19, wherein the light source is driven at a constant voltage, and wherein the change of the emission performance has an influence on a driving current of the light source and the angular velocity is obtained based on a change of the driving current.

25. A fiber-optic gyroscope as claimed in claim 19, wherein the light source is driven at a constant voltage, and wherein the change of the emission performance has an influence on a photocurrent of the monitoring diode and the angular velocity is obtained based on a change of the photocurrent.

26. A fiber-optic gyroscope as claimed in claim 19, wherein a phase-modulator is interposed at an end of the fiber coil, the returning light beams enter the monitoring diode, a photocurrent of the monitoring diode is synchronously detected by a carrier of the modulation frequency, and the angular velocity is obtained based on a synchronously-detected signal.

27. A fiber-optic gyroscope as claimed in claim 19, wherein the birefringent device separates ordinary beams and extraordinary beams and directs one of the ordinary beams and the extraordinary beams at the core of the optical fiber by arranging the birefringent device satisfying the inequality:

$$2|(n_e - n_o)| t \sin 2\alpha / (n_e + n_o) > D_f$$

wherein $n_e$ and $n_o$ are refractive indexes of extraordinary beams and ordinary beams respectively, t is a thickness of the birefringent device, $\alpha$ is an inclination angle of the anisotropic optical axis to the incident beams, and D is a diameter of the core of the optical fiber.

28. A fiber-optic gyroscope as claimed in claim 27, wherein the inclination angle of the anisotropic optical axis to the incident beam is in a range from about 25 degrees to about 65 degrees.

29. A fiber-optic gyroscope as claimed in claim 28, wherein the inclination angle is 45 degrees.

* * * * *